(12) United States Patent
Resnic

(10) Patent No.: US 11,952,786 B1
(45) Date of Patent: Apr. 9, 2024

(54) SYSTEMS AND METHODS FOR COVING A FACETED ROOM

(71) Applicant: CALLMyDRIVER, Inc., Marina del Rey, CA (US)

(72) Inventor: Daniel Resnic, Marina del Rey, CA (US)

(73) Assignee: CALLMyDRIVER, Inc., Marina del Rey, CA (US)

( * ) Notice: Subject to any disclaimer, the term of this patent is extended or adjusted under 35 U.S.C. 154(b) by 0 days.

(21) Appl. No.: 18/328,497

(22) Filed: Jun. 2, 2023

Related U.S. Application Data

(60) Provisional application No. 63/493,805, filed on Apr. 3, 2023.

(51) Int. Cl.
*E04F 19/04* (2006.01)
*E04C 2/30* (2006.01)
(Continued)

(52) U.S. Cl.
CPC ............ *E04F 19/0436* (2013.01); *E04C 2/30* (2013.01); *E04F 19/022* (2013.01); *E04F 19/04* (2013.01);
(Continued)

(58) Field of Classification Search
CPC ..... E04F 19/022; E04F 19/04; E04F 19/0477; E04F 19/0436; E04F 19/0486;
(Continued)

(56) References Cited

U.S. PATENT DOCUMENTS

| 1,250,594 | A | * | 12/1917 | Knapp | ................ | E04F 19/0436 |
| | | | | | | 52/288.1 |
| 2,069,289 | A | * | 2/1937 | Swendsen | ............... | E04F 19/04 |
| | | | | | | 52/717.06 |

(Continued)

FOREIGN PATENT DOCUMENTS

| CA | 2851474 A1 * 11/2015 | ............. E04F 15/10 |
| CN | 105839876 A * 8/2016 | ............. B32B 13/06 |

(Continued)

*Primary Examiner* — Jessie T Fonseca
(74) *Attorney, Agent, or Firm* — Metropolis IP Group, LLC; Eric Kang

(57) ABSTRACT

The present disclosure describes novel systems and methods for converting a faceted room with into a cyclorama. Four system embodiments, "EMB1," "EMB2," "EMB3," and "EMB4," are disclosed and have several common elements, including a corner coving piece ("CCP") and a bridging coving piece ("BCP"). EMB1 and EMB2 further comprise elements that collectively facilitate the alignment of adjoining pieces to form a seamless topology. EMB3 is a more basic embodiment that trades some alignment provisions for improved manufacturing simplicity and lower cost. EMB4 is distinguished by an embodiment where the main system elements can be fabricated from readily available materials by a non-expert using basic household tools; a method is disclosed herein to describe the construction steps as part of the overall process of converting a faceted room into a cyclorama. The two final disclosed methods guide the use of EMB1 or EMB2 for coving.

6 Claims, 31 Drawing Sheets

(51) Int. Cl.
*E04F 19/02* (2006.01)
*G03B 15/06* (2021.01)

(52) U.S. Cl.
CPC ...... *E04F 19/0477* (2013.01); *E04F 19/0486* (2013.01); *E04F 19/049* (2013.01); *G03B 15/06* (2013.01); *E04F 2019/0422* (2013.01)

(58) Field of Classification Search
CPC .. E04F 19/049; E04F 2019/0422; E04C 2/30; G03B 15/06
See application file for complete search history.

(56) References Cited

U.S. PATENT DOCUMENTS

| | | | |
|---|---|---|---|
| 2,274,317 A * | 2/1942 | Bonnell | E04F 19/0495 52/273 |
| 2,307,338 A * | 1/1943 | Sluyter | E04F 19/0495 52/288.1 |
| 2,921,352 A * | 1/1960 | Pfeifle | B22C 7/00 52/287.1 |
| 4,893,447 A | 12/1990 | Opp et al. | |
| 10,221,566 B2 | 3/2019 | von Tagen et al. | |
| 2008/0134602 A1 * | 6/2008 | Schick | E04F 19/0486 52/287.1 |
| 2012/0096787 A1 * | 4/2012 | Marcus | E04F 19/0486 52/287.1 |
| 2016/0244981 A1 * | 8/2016 | Klein | E04F 19/0472 |
| 2020/0141133 A1 * | 5/2020 | Lavallie | E04F 19/061 |

FOREIGN PATENT DOCUMENTS

| | | | | |
|---|---|---|---|---|
| DE | 102011110087 A1 * | 2/2013 | .......... | E04F 19/0486 |
| FR | 3013065 A1 * | 5/2015 | ............. | E04F 15/16 |
| GB | 2504485 A * | 2/2014 | .......... | E04F 19/0486 |
| GB | 2511517 A * | 9/2014 | ............... | B27G 5/02 |
| KR | 20130090152 A * | 8/2013 | ............. | E04F 15/16 |
| KR | 20210013998 A * | 2/2021 | ............. | H04N 5/222 |
| WO | WO-8705407 A1 * | 9/1987 | .......... | E04F 19/0486 |
| WO | WO-9714253 A1 * | 4/1997 | ............. | H04N 5/222 |
| WO | WO-2016134322 A1 * | 8/2016 | ............... | E04B 1/32 |

* cited by examiner

SYSTEMS AND METHODS FOR COVING A FACETED ROOM

CROSS-REFERENCE TO RELATED APPLICATIONS

The present application claims priority to provisional patent application No. 63/493,805 filed on Apr. 3, 2023, disclosures of which are incorporated herein at least by reference.

FIELD OF THE INVENTION

The field of the disclosure described herein relates to systems and methods to convert a faceted room into a cyclorama.

BACKGROUND OF THE INVENTION

A cyclorama, also called cyc background, or infinity wall, is a room or background that incorporates one or more curved surfaces that seamlessly change the inward normal orientation so that it is impossible to delineate the junction of the floor, walls, and ceiling. Unlike a room or background with faceted walls, a cyclorama appears to have limitless dimensions all around and relative to the subjects or objects within. Hence, cycloramas are commonly used for photographic/filming studios because of the wide array of viable lighting options, the enhancement they offer in emphasizing subjects in between the camera and background, and the possibility to implement what photography and filming artisans refer to as a green or blue screen so that an expansive, custom background can be artificially added after the shooting.

The main element that creates a cyclorama is called a cove, whereas a more decorative embodiment of a cove is called a cornice. The process of coving to create a cyclorama, as it is currently practiced by some can be viewed as a large-scale construction effort, comprises a method disclosed in the publication of Australian Patent Application Publication by Chernih (Application #AU2020100456A4) which describes the creation of an entirely bespoke room made up of a ribbed wooden structure, plaster, and sealant, which is very expensive because of the necessity of many special tools and man hours of professional craftsmen labor. Affordable Cyc Wall Systems® makes a custom, prefabricated system comprising a polystyrene foam insert that is adhered to an existing sheetrock wall and a concrete or wooden floor and is topped with a layer of fiberglass mesh and polymer cement coating. The common theme between the invention disclosed by Chernih, the product offered by Affordable Cyc Wall Systems®, and similarly for other providers of cyc wall construction, is that a large aspect involves prefabrication, special tools and training to install, seemingly high expense, and time to implement. There is also no semblance of viability with these systems in a universal kit form.

The U.S. Patent by Opp et al. (U.S. Pat. No. 4,893,447) discloses an invention comprised of molded cove sections with side flanges and provisions for adding plaster that can be used to convert a faceted room to a cyclorama with simple tools. However, this is also a prefabricated, seemingly expensive, and time-consuming methodology that cannot necessarily be customized after the components have been fabricated. The U.S. Patent by von Tagen (U.S. Pat. No. 10,221,566 B2) teaches an invention comprising large modular, molded sections of an entire cyclorama and the required special tool and method for constructing. As with Opp et al.'s patent, this invention is also prefabricated and seemingly expensive and cannot be customized once made. MyStudio® US31CYC Seamless Cyclorama Photo Background discloses a fully molded, tabletop-sized, one-piece cyclorama that does not require assembly but is positively a fixed form factor offering. The EASIFRAME® Cyclorama Curved Fabric Frame is a fixed-sized product designed to cove the floor to one wall. Numerous others offer variations of the same and none are viable for a universal coving kit nor buildable by a non-expert using basic household tools.

P PUREPOXY® makes PE-COVE, which is a multiple-component, pre-proportioned, epoxy coving and detailing mortar for vertical applications. It was demonstrated to provide limited radiusing for floor-to-wall molding coving, but the end effect is not suitable for studio applications nor enables a continuously sweeping side-to-side infinity background.

SUMMARY OF THE INVENTION

The present disclosure describes novel systems and methods for converting a faceted room with sharp break angles between adjoining walls, ceiling, and floor into a cyclorama. Four system embodiments, "EMB1," "EMB2," "EMB3," and "EMB4," are disclosed and have several common elements, including a concavo-convex corner coving piece ("CCP") and a concavo-convex bridging coving piece ("BCP"). EMB1 and EMB2 further comprise elements that collectively facilitate the alignment of adjoining pieces to form a seamless topology. EMB3 is a more basic embodiment that trades some alignment provisions for improved manufacturing simplicity and lower cost. EMB4 is distinguished by an embodiment where the main system elements can be fabricated from readily available materials by a non-expert using basic household tools; a method is disclosed herein to describe the construction steps as part of the overall process of converting a faceted room into a cyclorama. The two final disclosed methods guide the use of EMB1 or EMB2 for coving.

EMB1 and EMB2 further comprise a concavo-convex coving adaptor piece ("CAP"). EMB1 also comprises a thin alignment channel and slit for its CCP and BCP and, for the BCP and CAP, one or more male extension portions that collectively facilitate the alignment of the adjoining pieces into a seamless topology. "EMB2" is simpler than EMB1 in that there are no slits or alignment channels, but one side of each BCP has an underside flange instead of a male extension portion for aligning and optionally affixing the BCP to CCP or another BCP.

Another alternative system embodiment, called "EMB3," is a further simpler version of EMB2, wherein the CCP of EMB3 is identical to EMB2 but the BCP of EMB3 is devoid of any lateral underside flange, making this BCP essentially a substantially curved or concavo-convex panel whose orthogonal projection is substantially a rectangle or square. No slits, channels, or CAP are present in EMB3. Instead, a unique asymmetrical panel-to-panel connector is used to link two concavo-convex pieces.

Another alternative system embodiment, called "EMB4," is distinguished from the other system embodiments with a CCP that can be either prefabricated or made by the user with a thin, cuttable panel, a pair of scissors or equivalent cutting tools, tape, and a ruler. The CCPs are linked in between using the simple BCP of EMB3. Also, as with EMB3, no slits, channels, or CAP are present and the same asymmetrical panel-to-panel connector of EMB3 is used to align and adjoin two concavo-convex pieces.

BRIEF DESCRIPTION OF THE DRAWINGS

The drawings are provided to facilitate understanding in the detailed description. It should be noted that the drawing figures may be in simplified form and might not be to precise scale. In reference to the disclosure herein, for purposes of convenience and clarity, only directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE INVENTION

Figure 1:
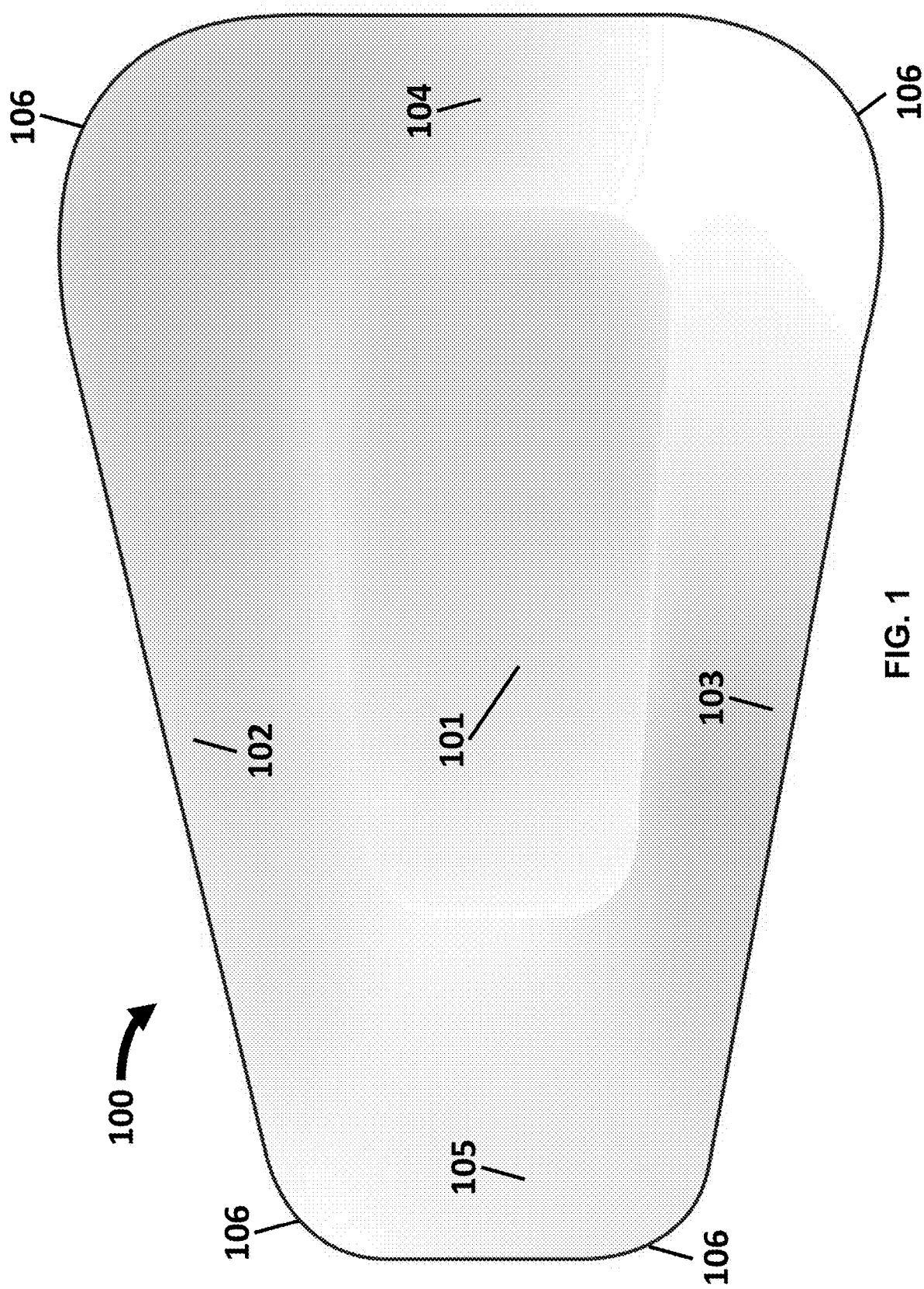
FIG. 1 is a perspective view of a cyclorama.

CYCLORAMA: FIG. 1 shows a representative cyclorama 100 that, by design, has surface-to-surface (e.g., wall-to-wall) junctions that appear ambiguous so that camera/video subjects within are more easily emphasized. An exemplary cyclorama comprises a plurality of wall surfaces 101-105 without defined breaks between adjoining wall surfaces and appears as one continuous surface. Directional changes of the walls are accomplished using concave, radiused topology 106, as easily depicted between walls 102-105, but also possible between wall 101 and the other walls 102-105. The following sections disclose a few embodiments of a system to convert standard, faceted rooms to a cyclorama using a combination of a corner coving piece ("CCP"), a bridging coving piece ("BCP"), and for two particular embodiments, a male-male coving adaptor piece ("CAP").

The following discloses four embodiments, herein termed EMB1, EMB2, EMB3, and EMB4 of varying levels of complexity, provisions to assist the end user in engaging and aligning one piece with another, manufacturing precision requirements, and production costs. While a few embodiments of the invention will be disclosed, it will be apparent to those skilled in the art that the invention may still be embodied otherwise without departing from the spirit and scope of the invention.

Embodiment EMB1

Figure 2:
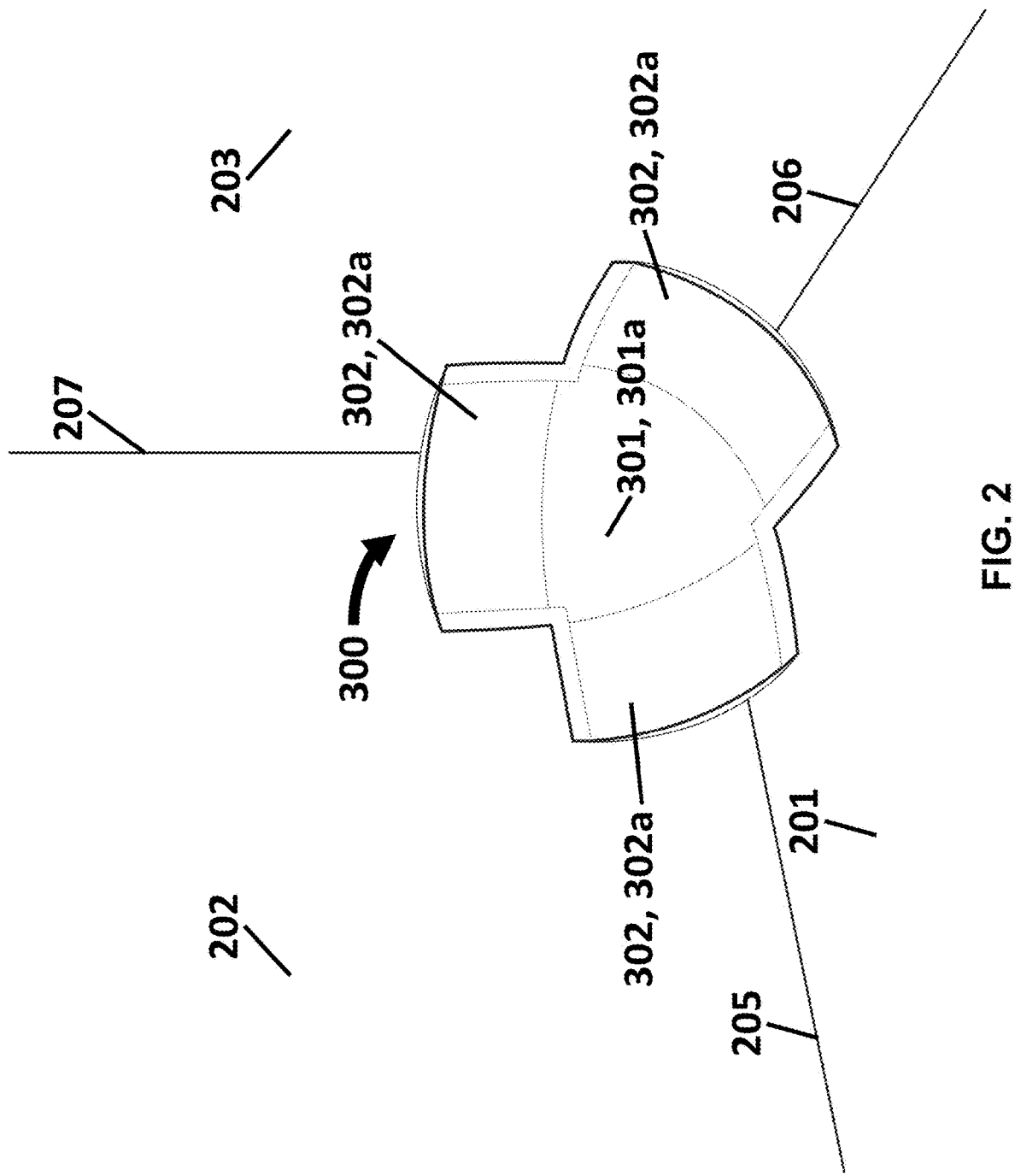
FIG. 2 is a perspective view of the outward-facing concave side of a corner coving piece (CCP) for one embodiment, EMB1.
Figure 3:
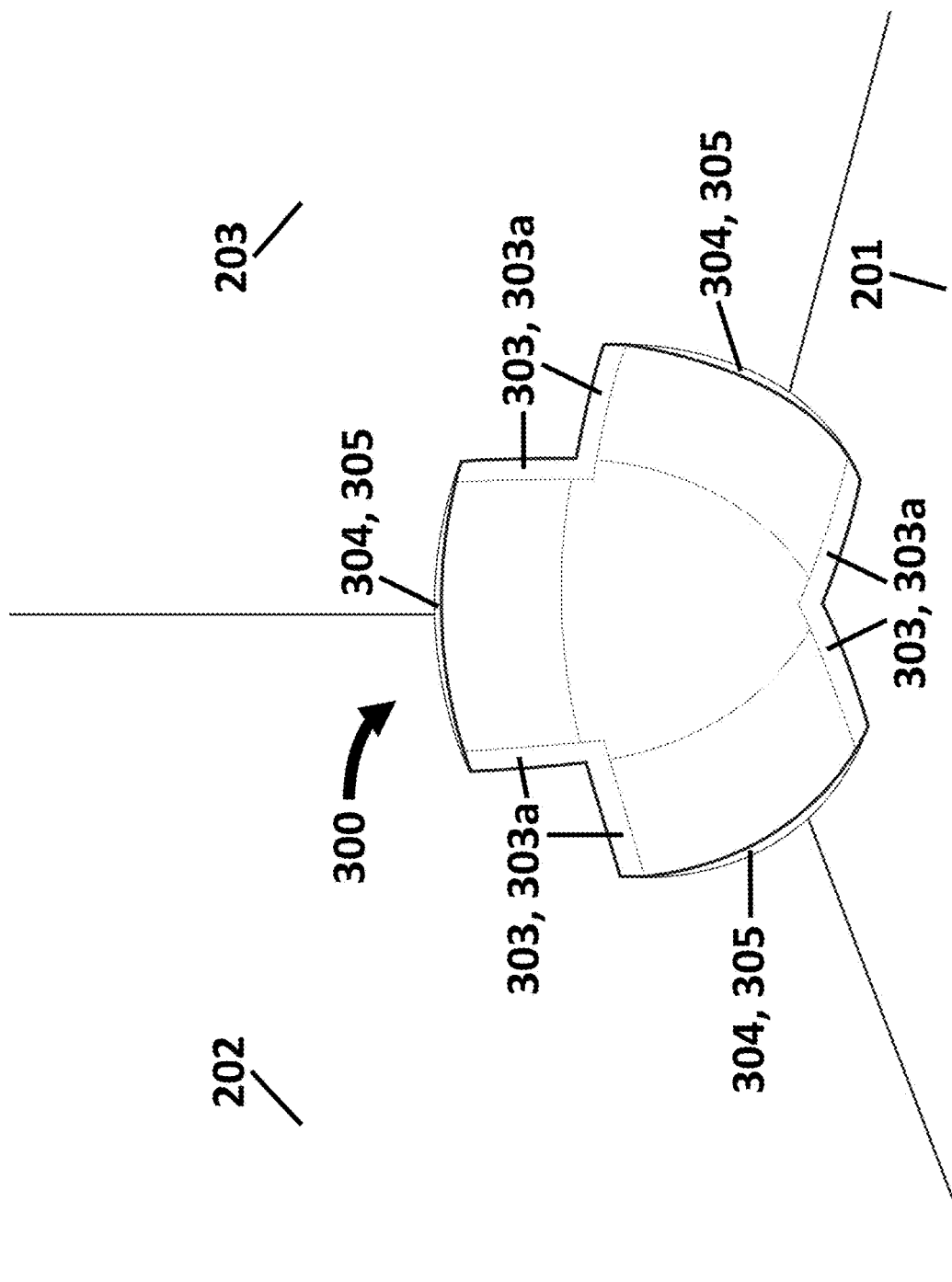
FIG. 3 is another perspective view of the outward-facing concave side of the CCP for EMB1.

EMB1's CORNER COVING PIECE (CCP): FIGS. 2-3 show the outward-facing surfaces of a concavo-convex CCP 300 element, which is designed to cove a faceted corner defined by three substantially straight walls 201-203 that join at a point. The relatively thin lines shown within the outer borders of the CCP 300 are apparent in FIGS. 2-3 to convey the concave topology and delineate the different elements of the CCP 300 that are not necessarily apparent and should not be easily in actuality. The CCP comprises a radiused center pocket 301 (outward-facing concave side shown as 301a), whose orthogonal projection forms a substantially triangular shape and covers the interaction point (not shown) of the three walls 201-203, and the nature of radiusing is about a point and not an axis. The radius of curvature, which is concave along the outward-facing concave surface, is at least 0.1 meters, but to obtain a properly diffuse lighting effect, the radius of curvature is preferably at least 0.3 meters, with the most diffuse effect achievable using a radius of curvature of at least 1.0 meter.

Said CCP further comprises a plurality of radiused flaps 302 (outward-facing concave side shown as 302a) whose orthogonal projection is substantially rectangular or square, wherein each flap 302 extends outward from the center pocket 301 and occludes view of the edges of intersecting walls 205-207 leading up to or away from the corner (not shown). Each exemplary flap 302 not only adjoins the center pocket 301, but also connects to adjacent flaps 302 at its two inside corners such that V-angle is formed. This flap-to-flap spatial relation promotes the most compact CCP 300 form to achieve the objective.

Each flap 302 comprises a thin channel under its outward-facing surface 302a (i.e., convex side) whose open end forms a slit 304 that spans a portion of the flap's arced length. The slit 304 and channel 305 are capable of receiving, guiding, and aligning portions of separate coving pieces (BCP and CAP) so that the outward-facing concave surfaces between two separate pieces adjoin and transition smoothly. Hence, the dimensions of the slit 304 and channel 305 are such that each can fully accommodate male extension portions in a "slip-fit manner" to be described later when describing the identical form factored slit 404 and channel 405 for the BCP 400. Adjoining pieces using this approach is easier than the approach of having plurality pin holes instead of a slit that receives a plurality of pins for a bridging piece because of the need to line up all the pins with pin holes before adjoining a bridging piece to a corner piece.

The radius of curvature for each flap's outward-facing concave surface 302a is exactly matched to that of the center pocket's outward-facing concave surface 301a. For CCPs used for rooms occupiable by humans, the minimum axial dimension of the flap 302 between the side connected to the center pocket 301 and the slit 304 end is on the order of 0.1 meters or a dimension that must be longer than the male extension portion described in the following section for the BCP so that the male extension portion of the BCP or CAP is fully accommodatable in the channel of said CCP 300.

Both radiused extents of said flaps 302 each has, extending from it, a non-radiused lip 303 (outward-facing concave side shown as 303a) whose wall-facing side 303b (shown later in FIG. 11 and the same side as the convex side of said flap 302) interfaces with and is attachable to the nearest wall or surface; the attachment means comprising fasteners including but not limited to staples, nails, screws, or equivalent penetrating through said lip 303 into the wall or adhesives such as glue or preferably a double-sided tape that initially has a peelable non-stick backing prior to installation. The orientation of said lip 303 is parallel to the wall to when the lip 303 is attached. A small portion of said center pocket 301 may be extendable with a non-radiused lip, with an elbow-like form, so that a continuous non-radiused lip 303 may be formed between two adjacent flaps 302.

Each lip 303 spans the entire axial length of the associated flap 302 and the width of each lip 303 is on the order of a centimeter or more, and the exact dimension is an arbitrary function of adhesiveness, the mass of the CCP 300, and potentially other factors. The adhesive can be applied to the entire or partial area of the wall-facing side of the lip 303b. Alternatively, as mentioned, staples, nails, or screws or equivalent may be penetrated through the lip from the outward-facing side 303a and hold the lip 303 and the rest of the CCP 300 in place.

Figure 4:
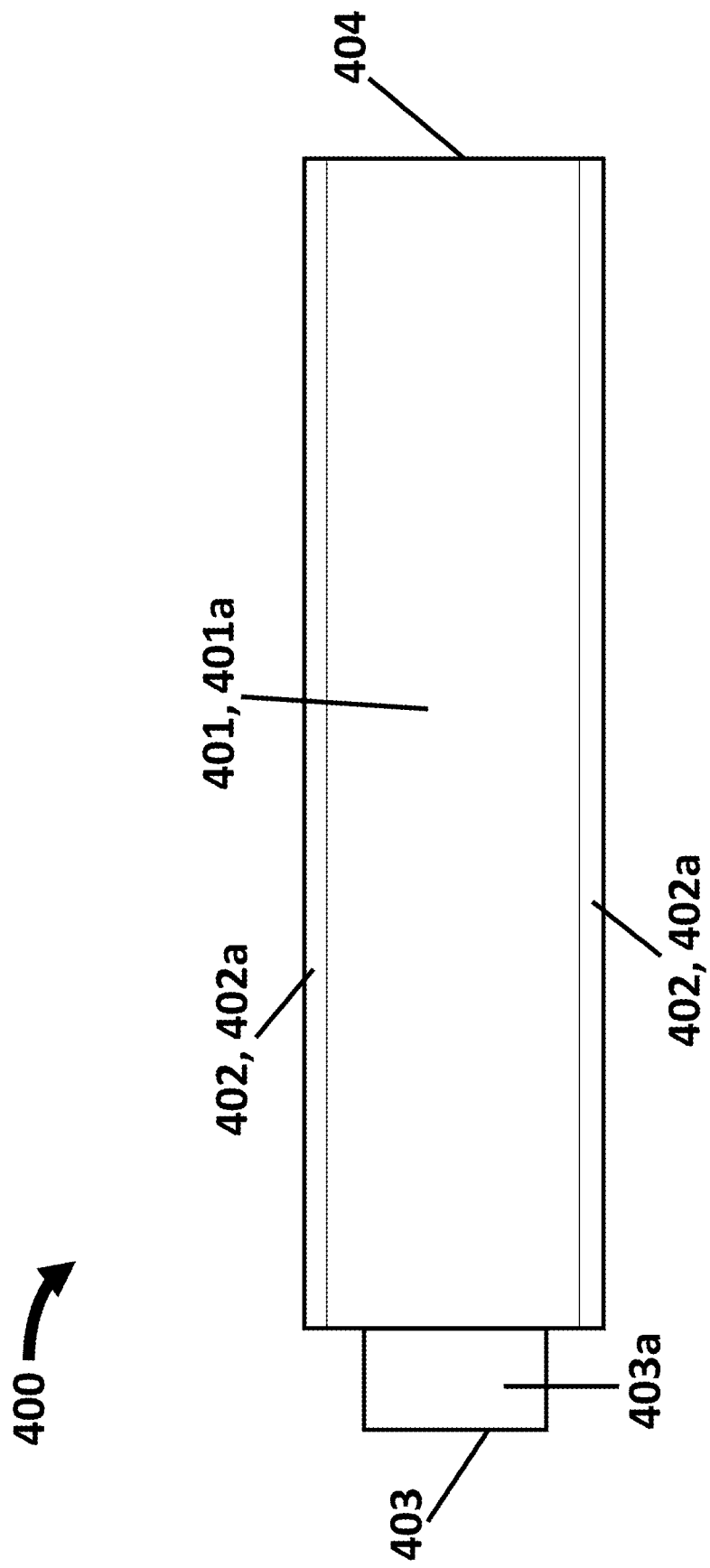
FIG. 4 is an orthogonal view of the outward-facing concave side of a bridging coving piece (BCP) for EMB1.
Figure 5:
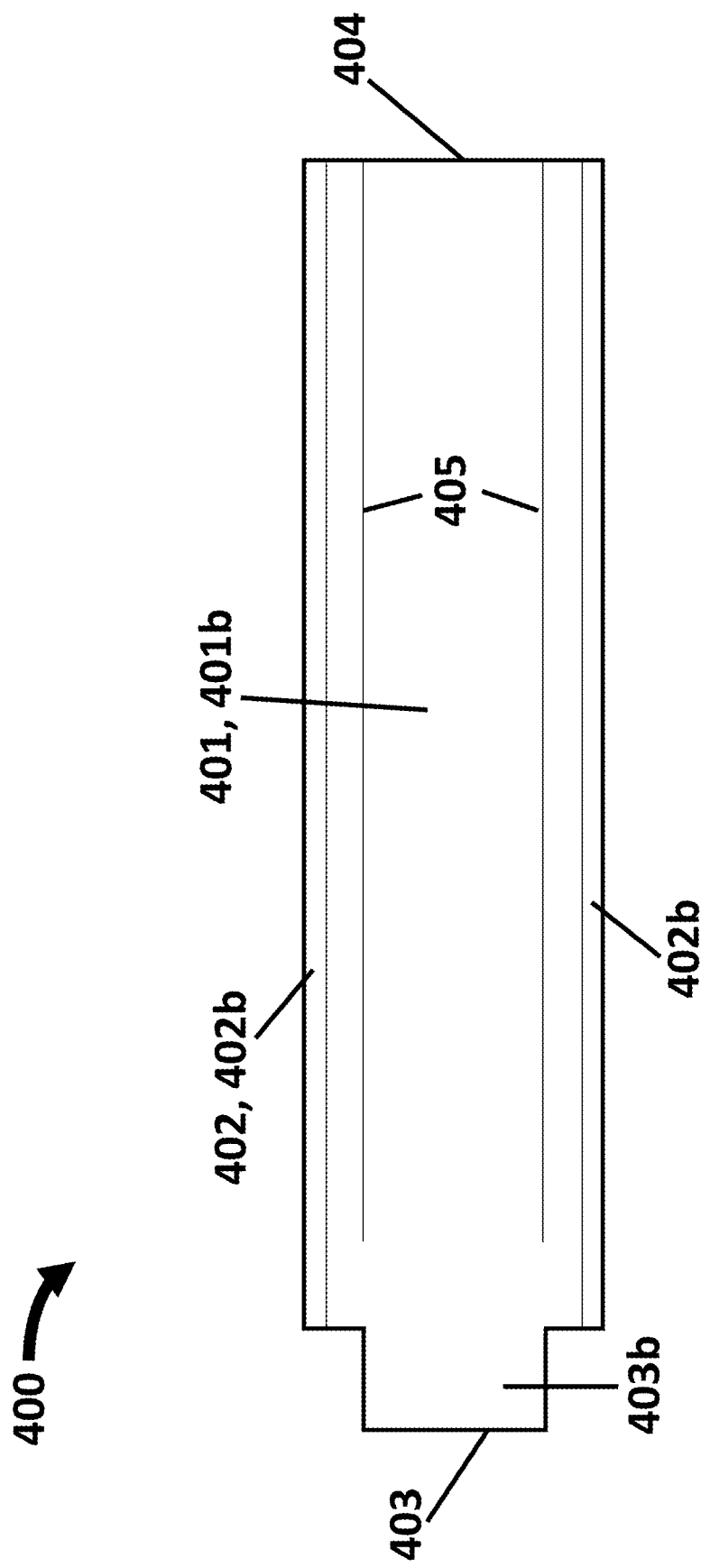
FIG. 5 is an orthogonal view of the wall-facing convex side of the BCP for EMB1.
Figure 6:
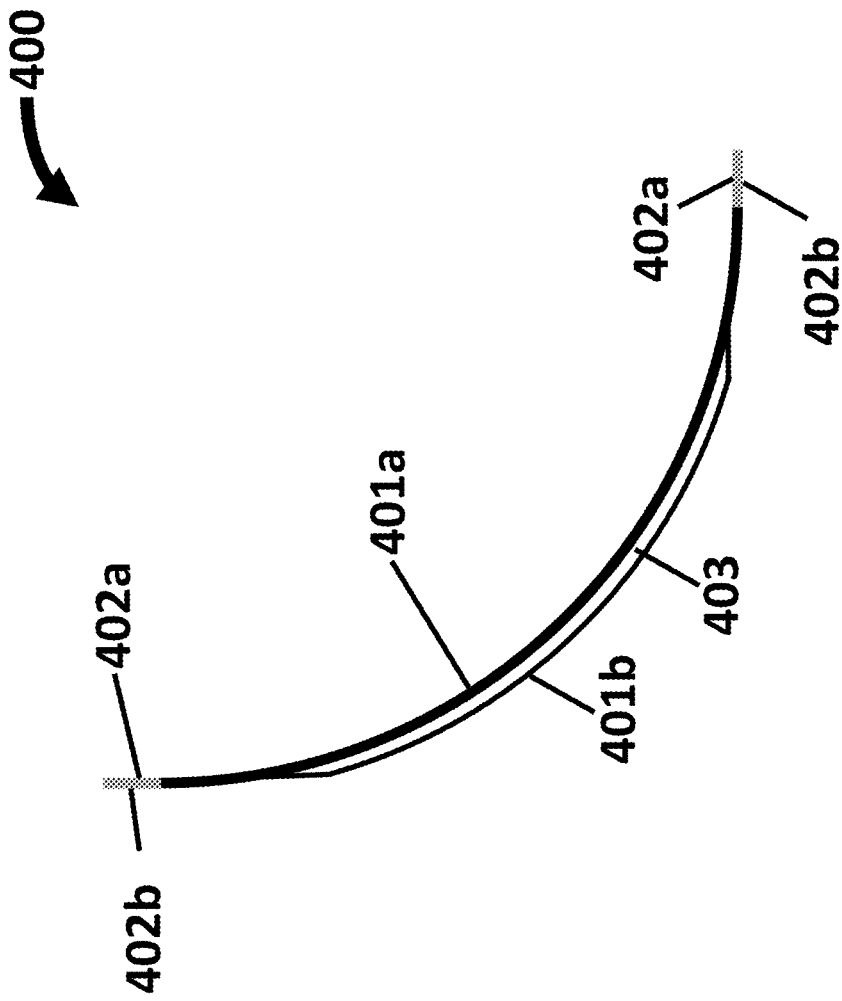
FIG. 6 is an orthogonal view of the male side of the BCP for EMB1.
Figure 7:
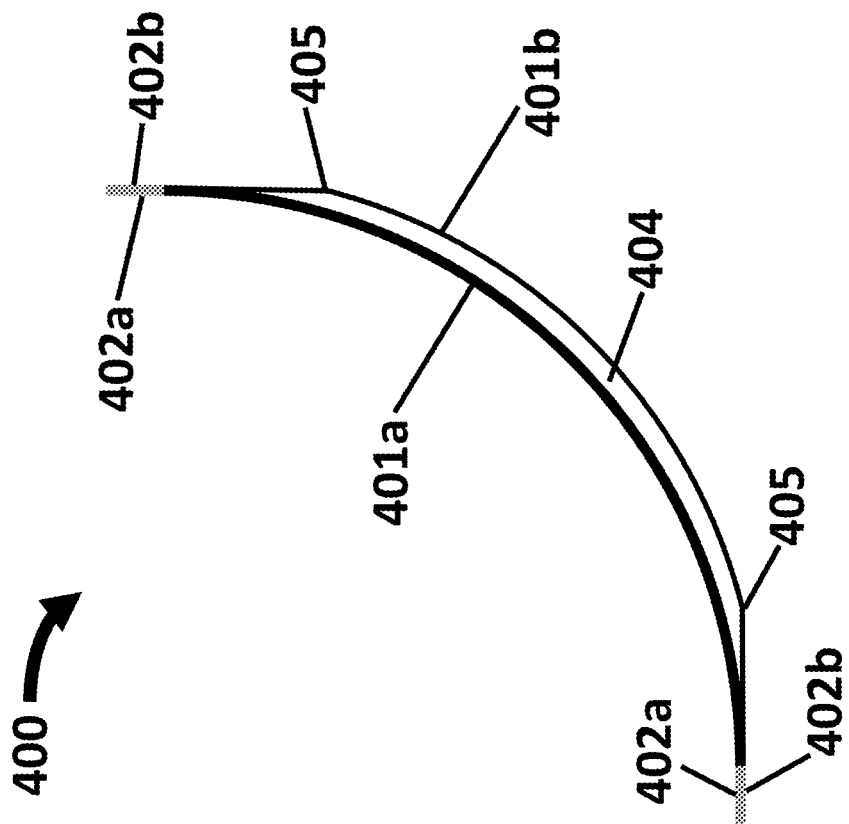
FIG. 7 is an orthogonal view of the female side of the BCP for EMB1.

EMB1's BRIDGING COVING PIECE (BCP): FIGS. 4-7 show various orthogonal views of the concavo-convex BCP 400, where the BCP 400 is used to cove an edge formed by two adjoining walls. FIG. 4 shows the outward-facing concave side, FIG. 5 shows the wall-facing convex side, FIG. 6 shows the male side 403 of the BCP 400, and FIG. 7 shows what will later be referred to as the female side 404 of the BCP 400 whose cross section is identical to the slit 304 of said flaps 302 of the CCP 300.

Every BCP 400 is radiused exactly as prescribed for the previously described center pocket 301 and flaps 302. The orthogonal projection of the curved panel portion 401 (where the outward-facing concave side is shown as 401a while the wall-facing convex side is shown as 401b) forms a substantially rectangular or square profile.

As with said flaps 302 of the CCP 300, both radiused extents of the curved panel portion 401 of the BCP each have extended from it, a non-radiused lip 402 (the outward-facing is shown as 402a while the wall-facing side is shown as 402b). The wall-facing side 402b of said lip 402 interfaces with and is attachable to the nearest wall, wherein the said preferred and alternative attachment means comprise what was previously described for the CCP's lip 303. The orientation of said lip 402 is parallel to the wall to which the lip is attached. The dimensions of the BCP's lip 402 and the manner in which the adhesive is applied for the BCP's wall-facing side of the BCP lip 402b are analogous to that of the wall-facing side of the lip 303b for the CCP 300. Note, the thin line seen in the figures delineating the BCP lip 402 for disclosure purposes is not necessarily perceived and should not be easily in actuality.

Jutting out from one side (left side in FIG. 5) of the BCP's non-radiused extent is a male extension portion 403 of finite thickness that spans a portion of the BCP's arc length (as shown in FIG. 6) and has an outward-facing concave side 403a and a wall-facing convex side 403b. The axial length or the dimension between left and right directions in the male extension portion 403 is sufficiently long to align the BCP 400 to another BCP 400 or flap 302. In practice, for rooms that are occupiable by humans, the axial length of the male extension portion 403 can generally span a range from 0.025 to 0.30 meters, but it should not be longer than the axial length of the channel 305 in said flap 302 or else the curved panel portion 401 will not be able to adjoin the flap 302.

On the opposite side of the male extension portion of the non-radiused extent of said BCP is a slit 404 whose cross-sectional form factor is identical to the open end 304 of said flap, as shown in FIG. 7. For clarity, the side with the slit end of the CCP 304 and BCP 404 is alternatively referred to as the female side. The slit 404 is the entrance to the BCP's thin alignment channel 405 which is internally bounded by a dimension that is less than the curved panel portion 401, as shown in FIGS. 5 and 7. A substantial fraction of the curved panel portion's 401 axial length is occupied by this internal channel 405, as shown by the relative length of the bounding lines of the BCP channel 405 in FIG. 5. The axial length of this internal channel 405 must also be longer than the axial length of the male extension portion 403.

Furthermore, the slit 404 and channel 405 do not extend beyond the lip; this extent is shown in FIG. 7 by a pair of creases on the wall-facing side of the BCP and a straight cross-sectional line leading up to the wall-facing side of the lip 402b. The cross-section of the CCP's slit 304 and channel 305 is identical to that of the BCP's slit 404 and channel 405.

The male extension portion 403 of the BCP is formed so it is similarly shaped but slightly smaller in all cross-sectional dimensions than the channel 305, 405 and slit 304, 404 of the CCP and BCP, such that the male extension portion 403 is engageable to the slit 304, 404 and channel 305, 405 in a "slip-fit" (i.e., interference fit) manner that allows sliding along the axial direction of the channel without any appreciable movement (i.e., no excessive "play") in non-axial directions. This aspect is important to form a seamless surface between two BCPs 400 or a CCP 300 and BCP 400. In order to support a "slip-fit" manner of engagement, the cross-section of the male extension portion 403 is similar in shape but undersized to the slit 304, 404 and channel 305, 405 on the order of ten to a few dozen thousandths of an inch. This implies the manufacturing tolerances for the male extension portion 403, slit 304, 404, and channel 305, 405 of the CCP and BCP are on the order of a few thousandths to a few hundredths of an inch. Within these tolerances and general clearances, it is expected there will be sufficient interference to provide some minimal but desirable slip-fit resistance but not high enough to bind during piece-to-piece fitting.

Other variations of EMB1 may have a male extension portion 403 wherein the leading edge of the male extension portion 403 is slightly narrower than the trailing portions to help guided entry through the slit 304, 404. Alternatively, the opening of the slit 304, 404 and channel 305, 405 near the slit may be slightly flared out from the rest of the channel to achieve the same purposes. Variations of EMB1 can also have a combination of a tapered male extension portion 403 and flared-out channel 305, 405 leading to the slit 304, 404 for easier engagement of multiple pieces.

Figure 8:
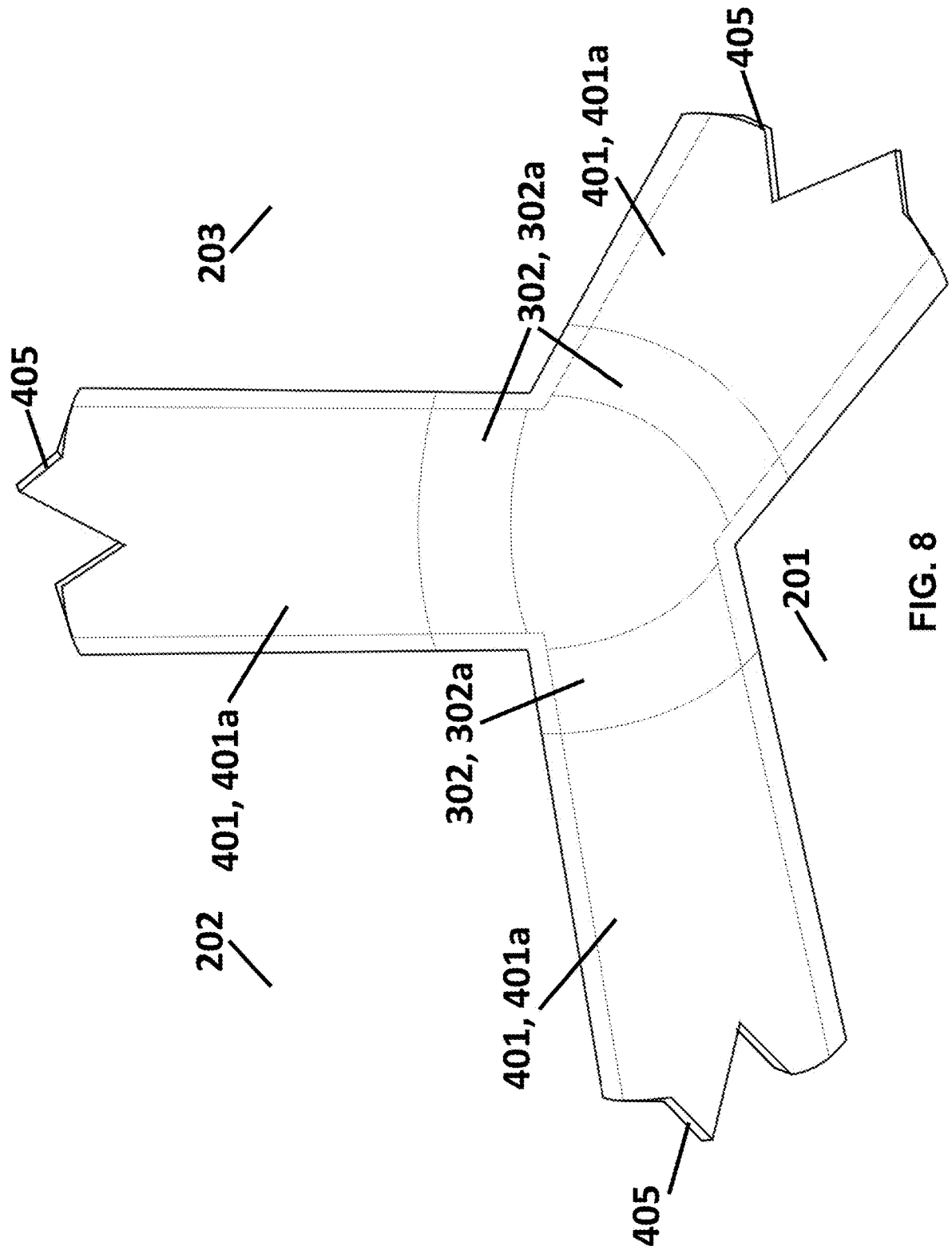
FIG. 8 is a perspective view of the outward-facing concave side of the CCP and three BCPs for EMB1.
Figure 9:
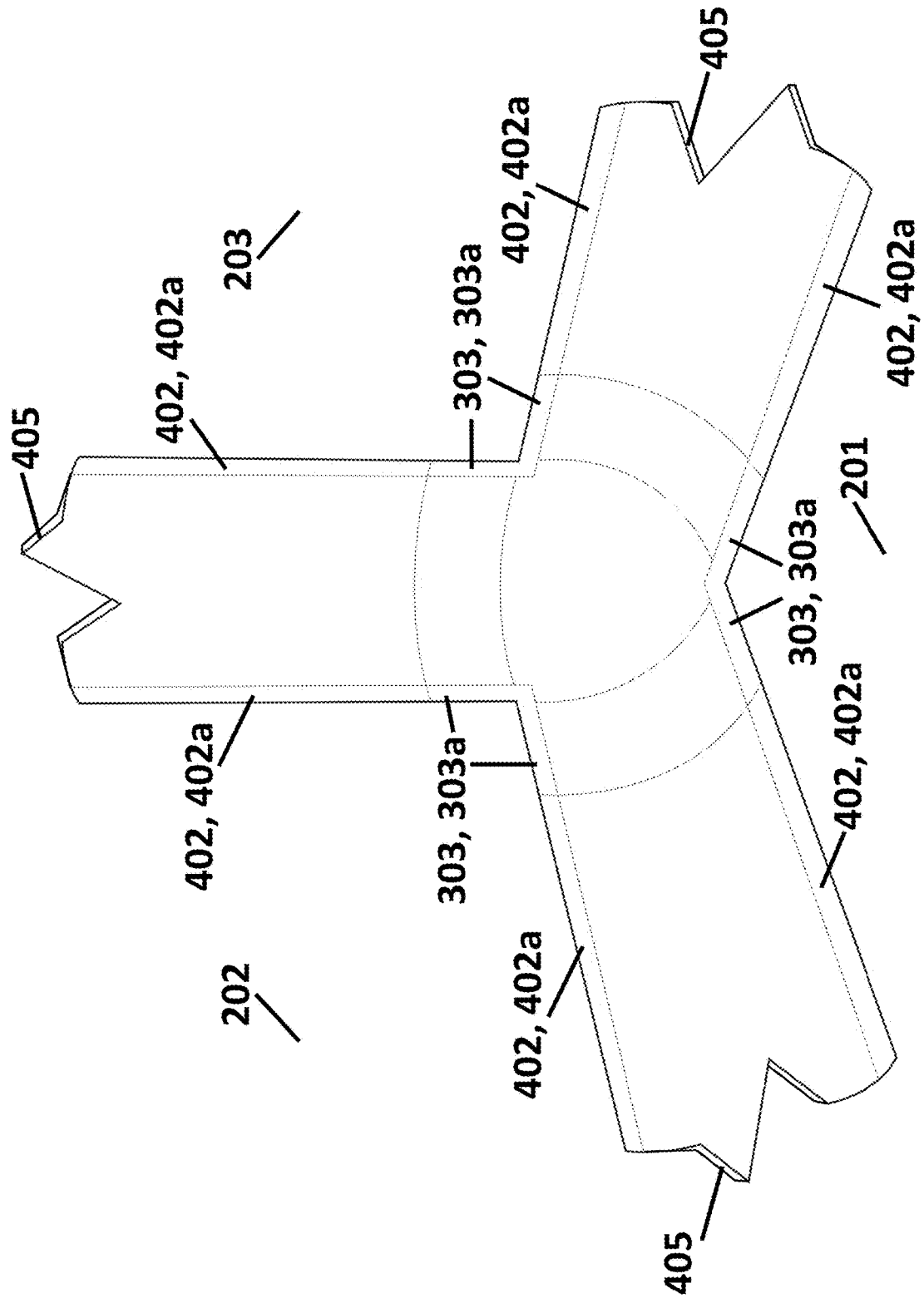
FIG. 9 is another perspective view of the outward-facing concave side of the CCP and three BCPs for EMB1.

EMB1's CCP AND BCP ASSEMBLY: FIGS. 8-9 show two slightly different perspective views of the assembly of one CCP 300 and three BCPs 400. As depicted, there are no gaps between the CCP's flap 302 and the adjoining BCP's curved panel portion 401. To the end user looking from approximately a foot or more, the transitions between two adjoined pieces should appear seamless. A broken line is shown for each of the three partially rendered BCPs 400. In practice, the axial length of each BCP's curved panel portion 401 will range from approximately a third of a meter to somewhat more than one meter for a room that accommodates humans. This implies multiple BCP 400 segments will be needed to cove the edges of a typical room to the proximity of the next wall corner. Since the exemplary BCP 400 has male 403 and female 404 sides, additional BCPs can be fitted in series.

For the purposes of description, during installation, the last installed BCP 400 with an open end will be hereinafter called the "advancing front BCP" ("AFBCP"). When the gap between the female side 404 of the AFBCP and the open female side 304 or, more generally, open end of the flap 302 of the CCP falls below a certain threshold, another type of component, called the male-male coving adaptor piece (CAP) 500, needs to be used to make the final link between two CCPs 300 along one edge, which will be described next.

Figure 10:
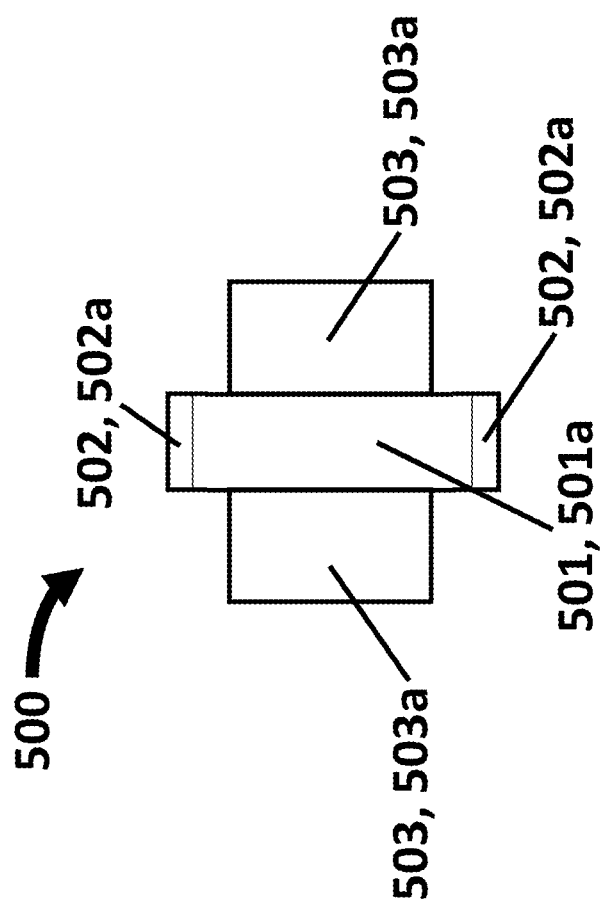
FIG. 10 is an orthogonal view of the outward-facing concave side of a male-male coving adaptor piece (CAP) for EMB1.
Figure 11:
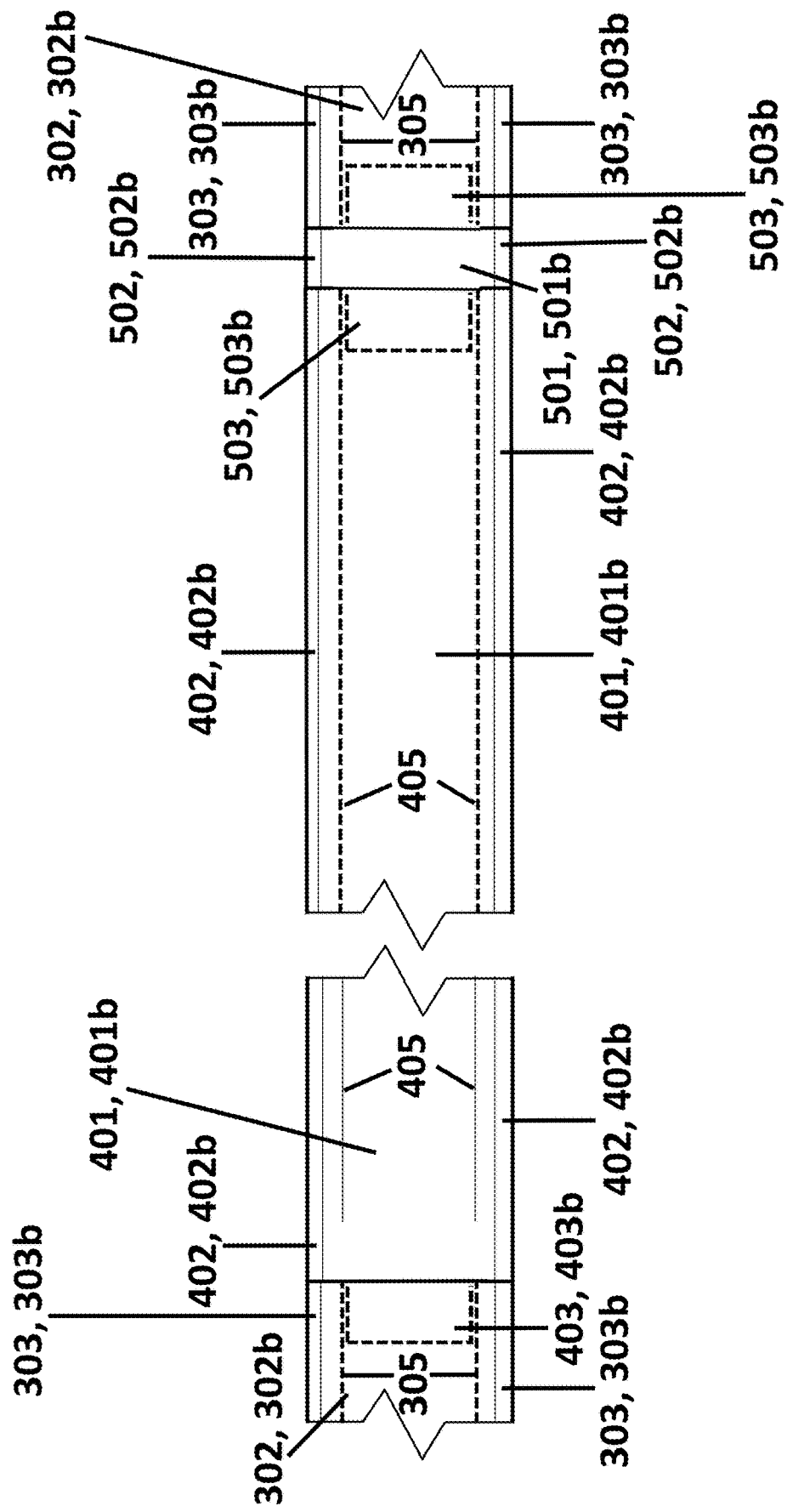
FIG. 11 is an orthogonal view of the wall-facing convex side of an assembly of flaps from two different CCPs, partially depicted BCPs, and CAP for EMB1.

EMB1's MALE-MALE COVING ADAPTOR PIECE (CAP): To connect the female side 404 of a BCP and female side 304 of a CCP's flap 302, the system includes a concavo-convex male-male coving adaptor piece (CAP) 500, which is shown in FIG. 10. The cross-sectional properties of the curved center portion 501 (whose outward-facing concave side is shown as 501a in FIG. 10 and the wall-facing convex side is shown in FIG. 11 as 501b) of the CAP 500 is like the curved panel portion 401 of the BCP except there is no channel running along the underside or wall-facing side of the CAP 500. The orthogonal projection of the curved center portion 501 forms a substantially rectangular or square profile.

As with said flaps 302 of the CCP 300 and BCP 400, both radiused extents of the curved center portion 501 of the CAP 500 each have extended from it, a non-radiused lip 502 (whose outward-facing concave side is shown as 502a in FIG. 10 and the wall-facing convex side is shown in FIG. 11 as 502b) interfaces with and is attachable to the nearest wall, wherein said preferred and alternative attachment means comprise what was previously described for the wall-facing side of the CCP and BCP lips 303, 402. The orientation of said lip 502 is parallel to the wall to which the lip is attached. The dimensions of the CAP's lip 502 and the manner in which the adhesive is applied for the CAP's wall-facing side of the lip 502b are also at least analogous to that of the wall-facing side of the lip 303b, 402b for the CCP 300 and BCP 400, respectively. Note, the thin line delineating the curved center portion 501 and lip 502 for disclosure purposes are not necessarily and should not be easily perceived in actuality.

Each of the non-radiused or lateral extents of the CAP's curved center portion 501 is where one male extension portion 503 (whose outward-facing concave side is shown as 503a and the wall-facing convex side is shown in FIG. 11 as 503b) extends from. The cross-sectional attributes of each male extension portion 503 are identical to that of the BCP's male extension portion 403. In practice, one male extension portion 503 of the CAP 500 is engaged with the female side 404 of a BCP 400 and the other male extension portion of the CAP 500 is engaged with the female side 304 of the CCP's flap 302. As mentioned for the BCP's male extension portion 403, embodiments of the CAP's male extension portion 503 may have a tapered male extension portion 503 wherein the leading edge of the male extension portion 503 is slightly narrower to help guide entry through the slit 304, 404 and/or the slit 304, 404 and channel 305, 405 are flared out slightly.

Method of Coving Using EMB1

METHOD OF COVING FOR EMB1: The method of coving for EMB1 comprises and begins with the placement of one CCP 300 above one corner and the provisional placement of the remaining CCPs 300 over the other corners, then selecting one wall-to-wall edge and connecting one or more BCPs 400 in series starting from the female side 304 of one CCP 300 until the remaining gap between the female side 404 of the AFBCP and the female side 304 of the nearest CCP is equal to or less than the end-to-end axial length of the CAP's curved center portion 501. More specifically, the preferred approach for a given edge begins with sliding the male extension portion 403 of a BCP into the female side 304 and channel 305 of the nearest CCP's flap until one side (e.g., left) of the curved panel portion 401 is in contact with the female side 304 of the nearest CCP flap. Following this, if the remaining space to the unattached CCP 300 on the same wall edge is sufficient per the above guidelines, attaching successive BCPs 400 in the same manner, except now disposing the male extension portion 403 of the AFBCP into the female side 404 and channel 405 of the previously placed BCP 400.

The curved panel portion 401 of the AFBCP 400, if necessary, is cut to length such that the gap between the female side 404 of the AFBCP and the female side 304 of the nearest CCP is approximately equal to the axial length of the CAP's curved center portion 501. Following this, attaching the female side 304 of the CCP nearest to the AFBCP to one of the male extension portions 503 of said CAP 500 to create a CCP-CAP subassembly 300, 500; disposing the other male extension portion 503 of said CCP-CAP 300, 500 subassembly through the female side 404 and channel 405 of the AFBCP until one side of the CCP-CAP 300, 500 is integrated with the AFBCP 400; and placing the CCP-CAP-AFBCP 300, 500, 400 subassembly to the corner and portion of the walls that need to be coved next.

The process is repeated for the remaining wall-wall edges and corners if non-coved corners are present. For fastening methodologies using a sticky tape, included double-sided types, initially with an adhesive backing that may be peeled as the CCP 300, BCP 400, CAP 500, or subassembly of said pieces are individually and finally placed.

FIG. 11 shows an orthogonal wall-facing view of the EMB1 system components assembled together to show the relation of the CCPs 300, BCPs 400, and CAP 500 from one wall corner to another wall corner over one wall-to-wall edge. Starting from the left is the wall-facing side of the (partially depicted) flap 302 of a CCP 300, wherein the female side 304 receives the male extension portion 403 until the curved panel portion 401 adjoins and is flush with the flap 302. Additional BCPs 400 can be added and connected in series using the same approach described for the BCP-CCP interface. The female side 404 of the AFBCP along an edge receives the male extension portion 503 on one side of the CAP 500 while the other male extension portion 503 on the other side is disposed through the female side 304 and channel 305 of the (partially depicted) flap 302 of the second (right-most in FIG. 11) CCP 300.

Embodiments EMB2 and EMB3

Figure 12:
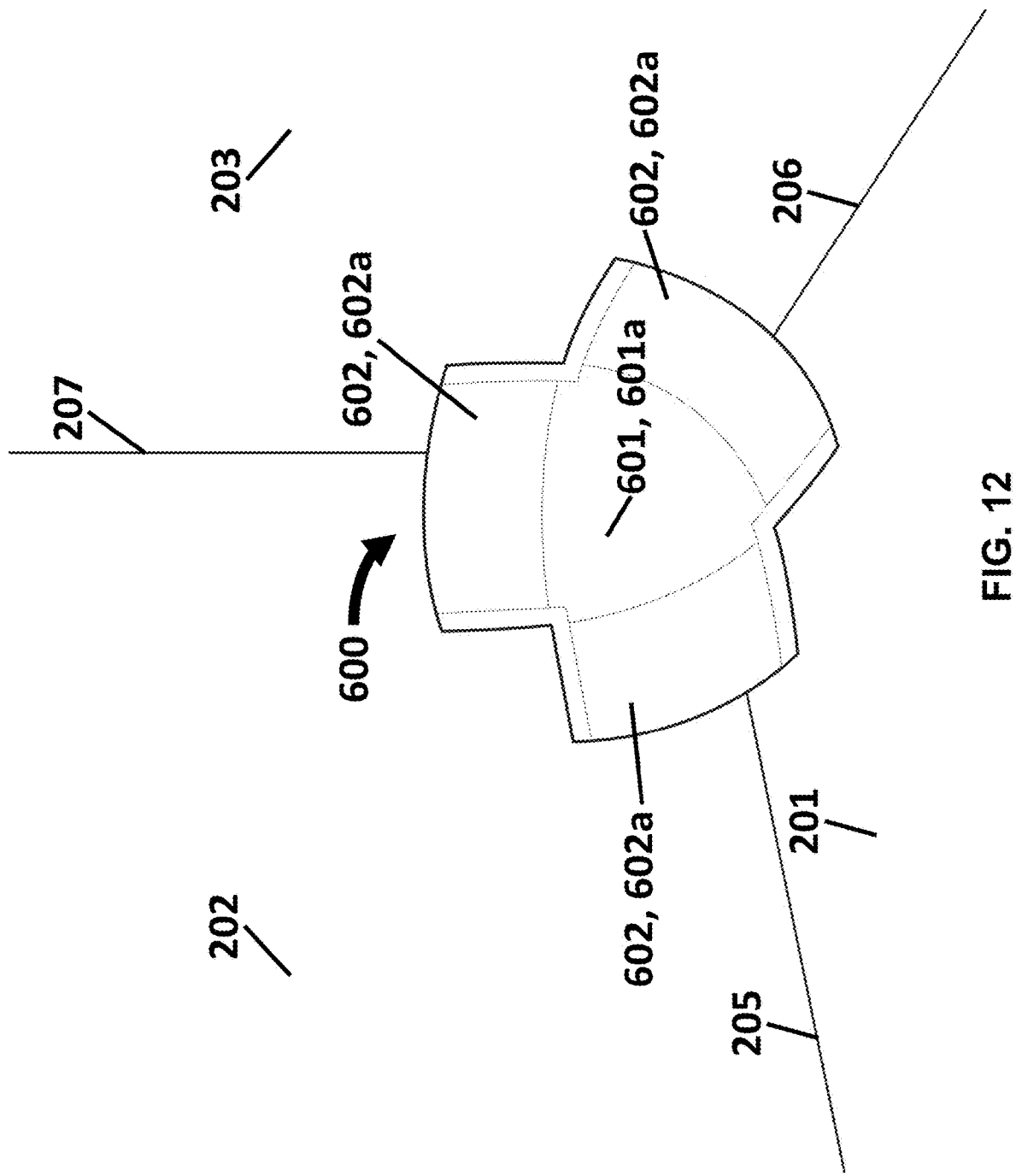
FIG. 12 is a perspective view of the outward-facing concave side of a CCP for two alternative system embodiments, EMB2 and EMB3.
Figure 13:
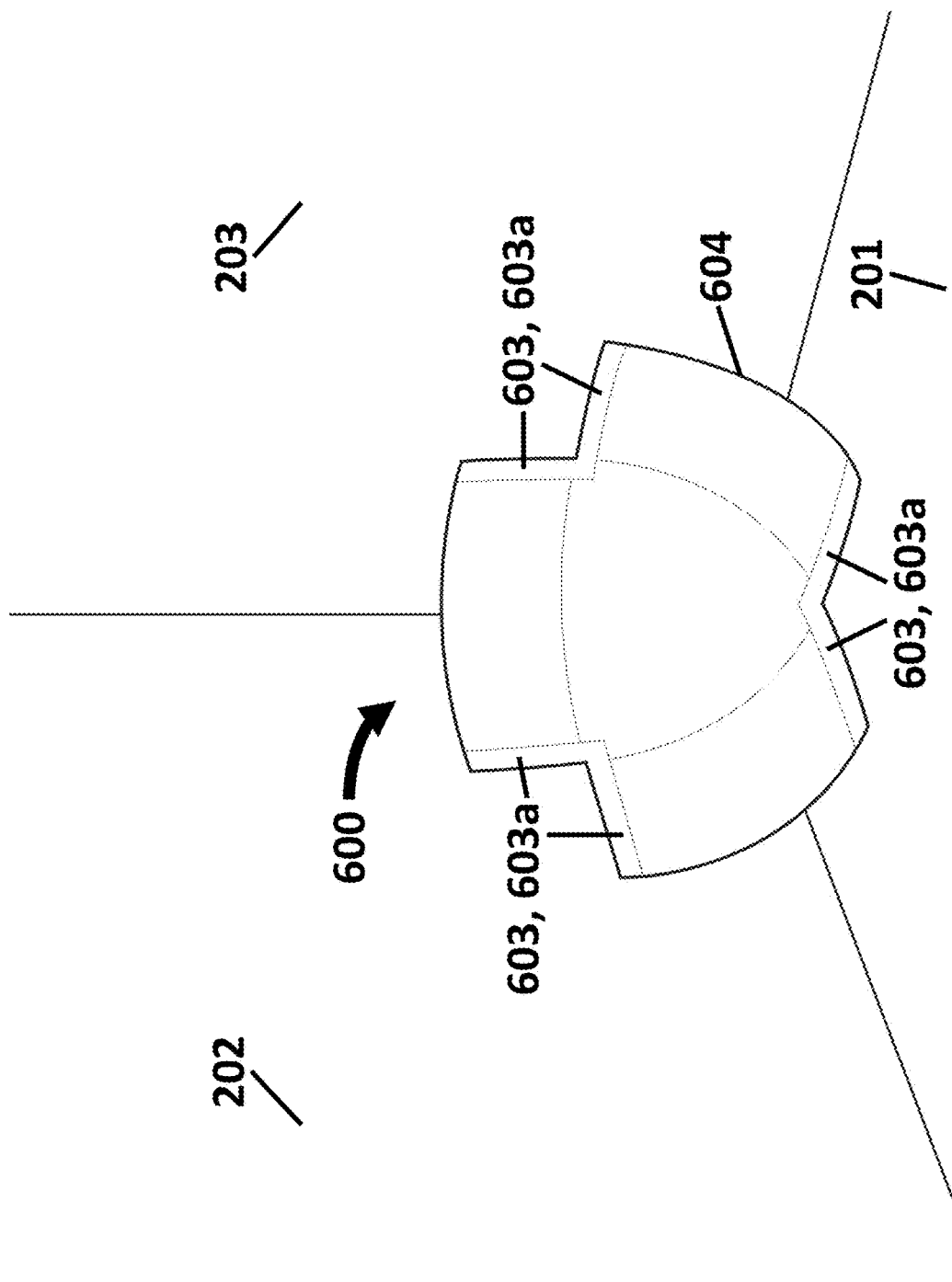
FIG. 13 is another perspective view of the outward-facing concave side of the CCP for EMB2 and EMB3.

EMB2's and EMB3's CORNER COVING PIECE (CCP): FIGS. 12-13 show the CCP for EMB2 and EMB3. The differences between the CCP of EMB2 and EMB3 600 versus that of EMB1's CCP 300 are that EMB2's and EMB3's CCP 600 lack the female side's slit 304 and alignment channel 305 of EMB1's CCP 300. Aside from the slit and alignment channel, at least for one embodiment, every other aspect of EMB2's and EMB3's CCP 600 is equivalent to that of EMB1'S CCP 300. Table 1 summarizes the mapping of EMB2's and EMB3's CCP reference numbers to EMB1's CCP reference numbers so the description for equivalent EMB1 elements may be referred to for elucidation of each of EMB2's and EMB3's CCP 600 structure and functionalities without the need to be repeated.

TABLE 1

Mapping of EMB2/EMB3 CCP Reference Numbers to EMB1 CCP Reference Numbers

| Part Description | EMB2/EMB3 Ref. Number | EMB1 Ref. Number |
| --- | --- | --- |
| Radiused center pocket | 601 | 301 |
| Outward-facing side of radiused center pocket | 601a | 301a |

TABLE 1-continued

Mapping of EMB2/EMB3 CCP Reference Numbers to EMB1 CCP Reference Numbers

| Part Description | EMB2/EMB3 Ref. Number | EMB1 Ref. Number |
| --- | --- | --- |
| Wall-facing side of radiused center pocket | 601b | 301b |
| Flap | 602 | 302 |
| Outward-facing side of flap | 602a | 302a |
| Wall-facing side of flap | 602b | 302b |
| Non-radiused lip | 603 | 303 |
| Outward-facing side of non-radiused lip | 603a | 303a |
| Wall-facing side of non-radiused lip | 603b | 303b |

Figure 14:
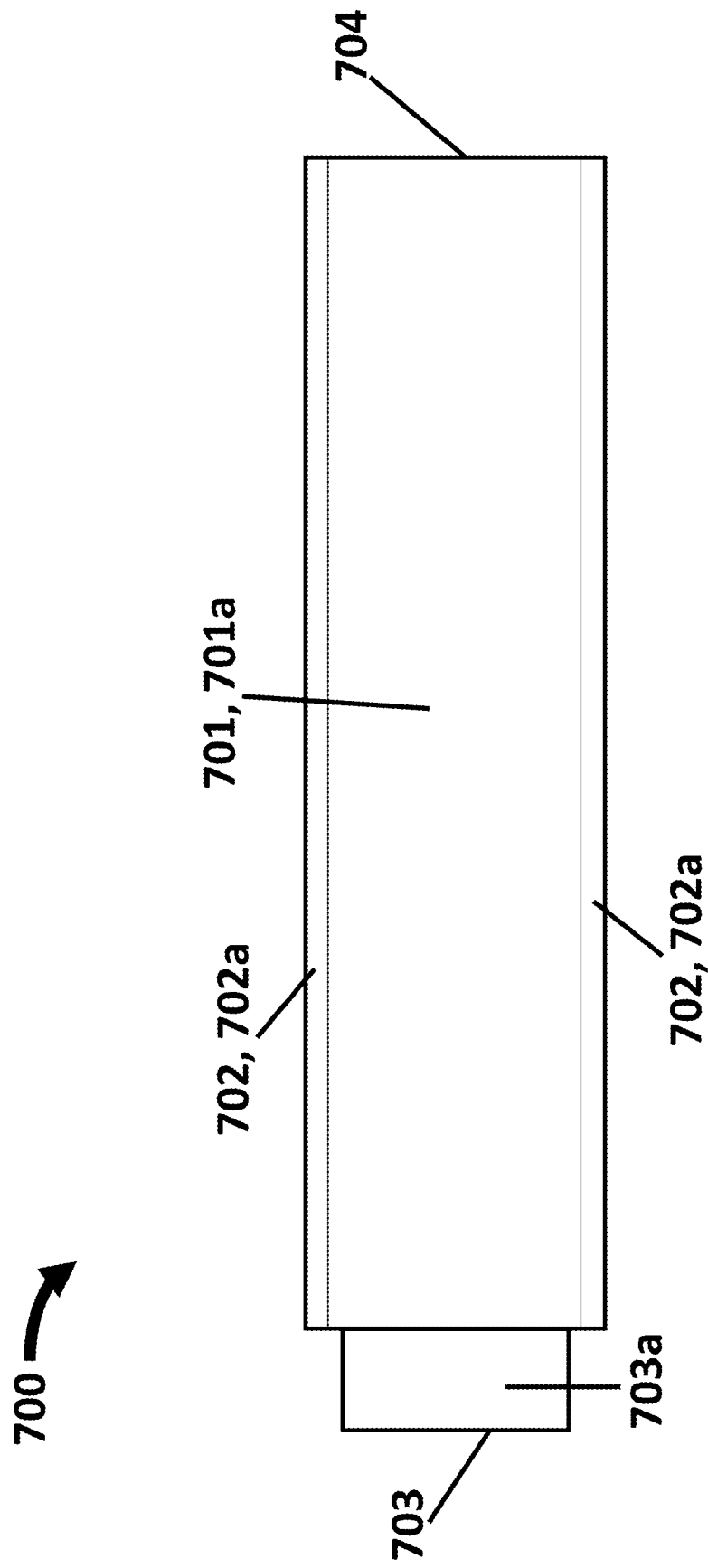
FIG. 14 is an orthogonal view of the outward-facing concave side of a BCP for EMB2.
Figure 15:
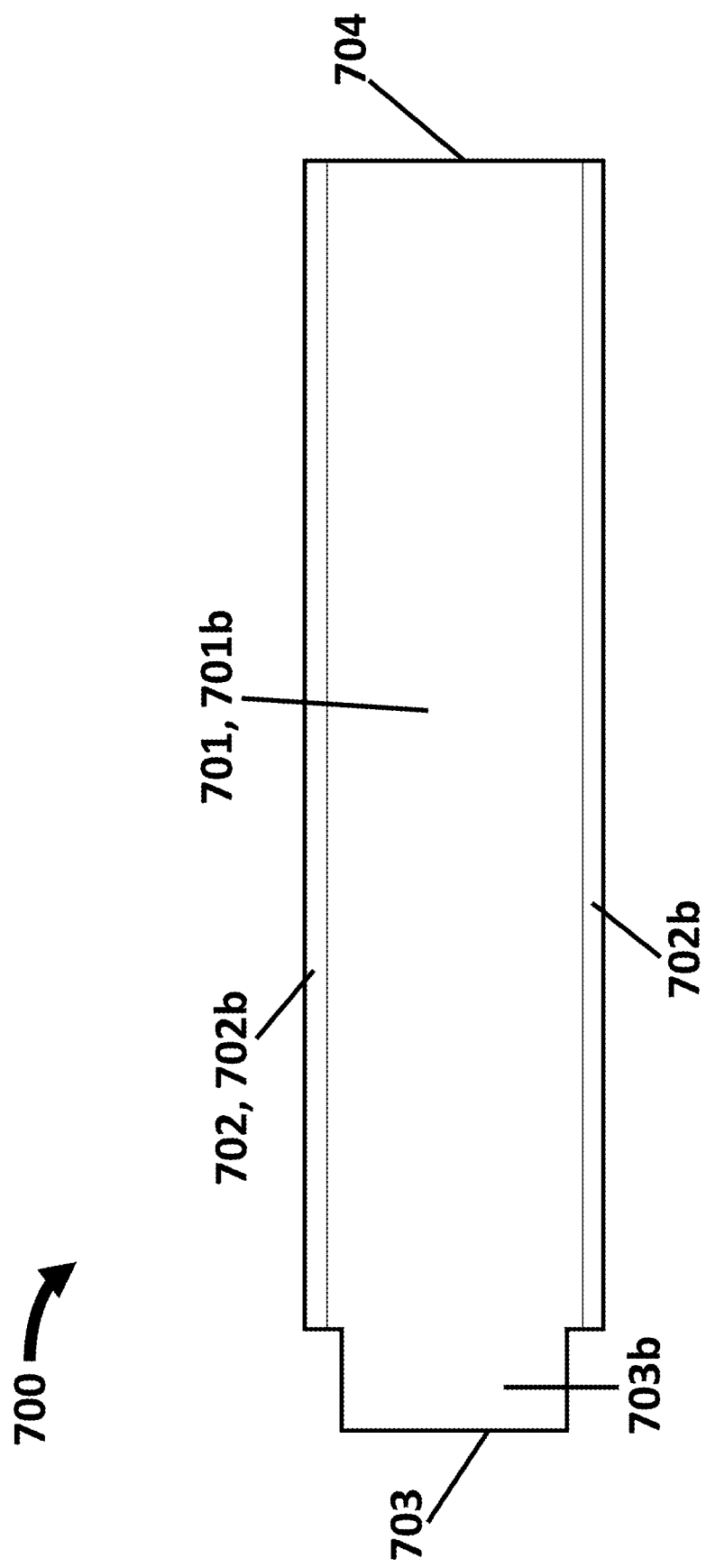
FIG. 15 is an orthogonal view of the wall-facing convex side of the BCP for EMB2.
Figure 16:
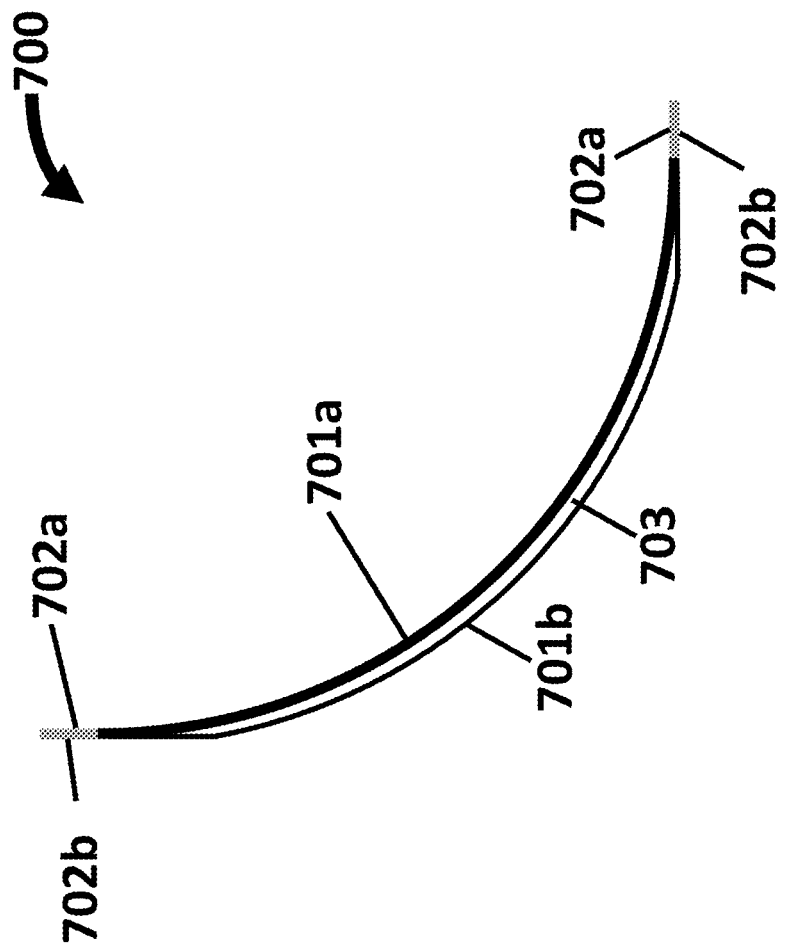
FIG. 16 is an orthogonal view of the underside flange end of the BCP for EMB2.

BRIDGING COVING PIECE (BCP) of EMB2, EMB3, and EMB4: FIGS. 14-16 show the BCP for EMB2 700 and EMB3 1100 (shown later in FIGS. 21-22) is a simplified embodiment of EMB1. The differences between the BCP of EMB2 700 and that of EMB1's BCP 400 are that EMB2's BCP 400 lacks the female side's slit 404 and alignment channel 405 of EMB1's BCP. Furthermore, the male extension portion 403 of EMB1 is replaced by a similarly, but not identically, shaped underside flange 703. The outward-facing concave side 703a of the underside flange serves to conform around the wall-facing convex side 602b of the CCP's flap or the curved panel portion 701b of another BCP; this helps provide a seamless outward-facing concave surface transition between two pieces. During engagement of the underside flange 703 with the wall-facing convex side of the other piece 602b (flap of CCP), 701b (curved panel portion of BCP) in one embodiment can be grooved or have a pair of parallel ridges (not shown) to guide the underside flange 703 during engagement with another piece 600, 700. The width of the groove or distance between the parallel ridges is wider than the span of the underside flange 703 by an infinitesimally amount to accommodate the underside flange without excessive "play."

Unlike the outward-facing side 403a of the male extension portion of EMB1's BCP, embodiments of EMB2's outward-facing side 703a may have an attachment means applied by the end-user or pre-applied by the manufacturer or vendor. The preferred and alternative attachment means that promotes overall rigidity of the entire installation comprise what was previously described for the wall-facing side 303b, 402b, 502b of the CCP, BCP, and CAP lips; i.e., during installation, the outward-facing side of the underside flange 703a of EMB2's BCP 700 is fastened or adhesively affixed to a portion of the wall-facing convex side 701b, 602b of another EMB2's BCP or EMB2's CCP flap. The means of fastening include but are not limited to adhesives such as glue or preferably a tape with a peelable non-stick backing prior to installation.

FIG. 16 shows the cross-section of the underside flange 703 of EMB2's BCP. Compared to the male extension portion 403 of the EMB1's BCP, the arc length relative to the curved panel portion's 701 total arc length of the underside flange 703 is longer since it does not have to fit within a slit 304, 404 or channel 305, 405 like that of EMB1. A longer arc length of the underside flange 703 is desirable to better assure alignment with other pieces 600, 700. The limiting arc length dimension of the underside flange 703 is that it cannot extend beyond the wall-facing side of the BCP's lip 702b. This is easily apparent in the limiting case where a straight cross-sectional line comes down from the wall-facing side 702b of the lip, as shown in FIG. 16.

The BCP 1100 of EMB3 and EMB4 (shown later in FIGS. 21-22) completely lacks an underside flange 703 and is simply comprised of the curved panel portion 701 and the non-radiused lips 702. The orthogonal projection of EMB3 would thus be a rectangle for the exemplary curved portion shown. With the EMB3/EMB4 embodiment 1100 of the BCP, the non-radiused lateral or axial extents would simply butt up against the open end 604 of a CCP flap or another BCP 1100. Table 2 summarizes the mapping of EMB2's and EMB3's BCP reference numbers to EMB1's BCP reference numbers so the description for equivalent EMB1's BCP elements may be referred to for elucidation of each of EMB2's and EMB3'S BCP structure and functionalities without the need to be repeated.

TABLE 2

Mapping of EMB2/EMB3 BCP Reference Numbers to EMB1 BCP Reference Numbers

| Part Description | EMB2/EMB3 Ref. Number | EMB1 Ref. Number |
| --- | --- | --- |
| Curved panel portion | 701 | 401 |
| Outward-facing side of curved panel portion | 701a | 401a |
| Wall-facing side of curved panel portion | 701b | 401b |
| Non-radiused lip | 702 | 402 |
| Outward-facing side of non-radiused lip | 702a | 402a |
| Wall-facing side of non-radiused lip | 702b | 402b |

Figure 17:
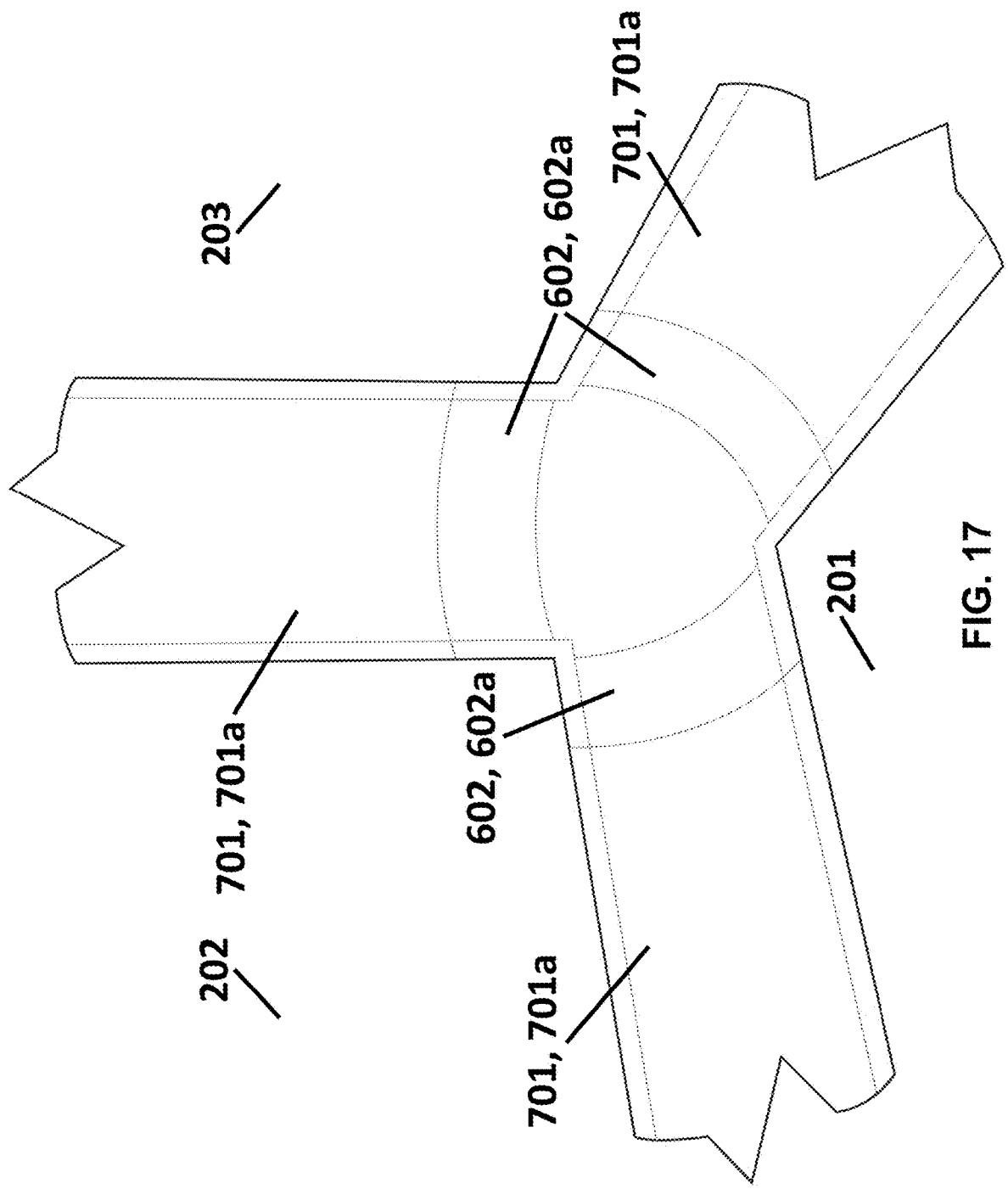
FIG. 17 is a perspective view of the outward-facing concave side of the CCP and three BCPs for EMB2.
Figure 18:
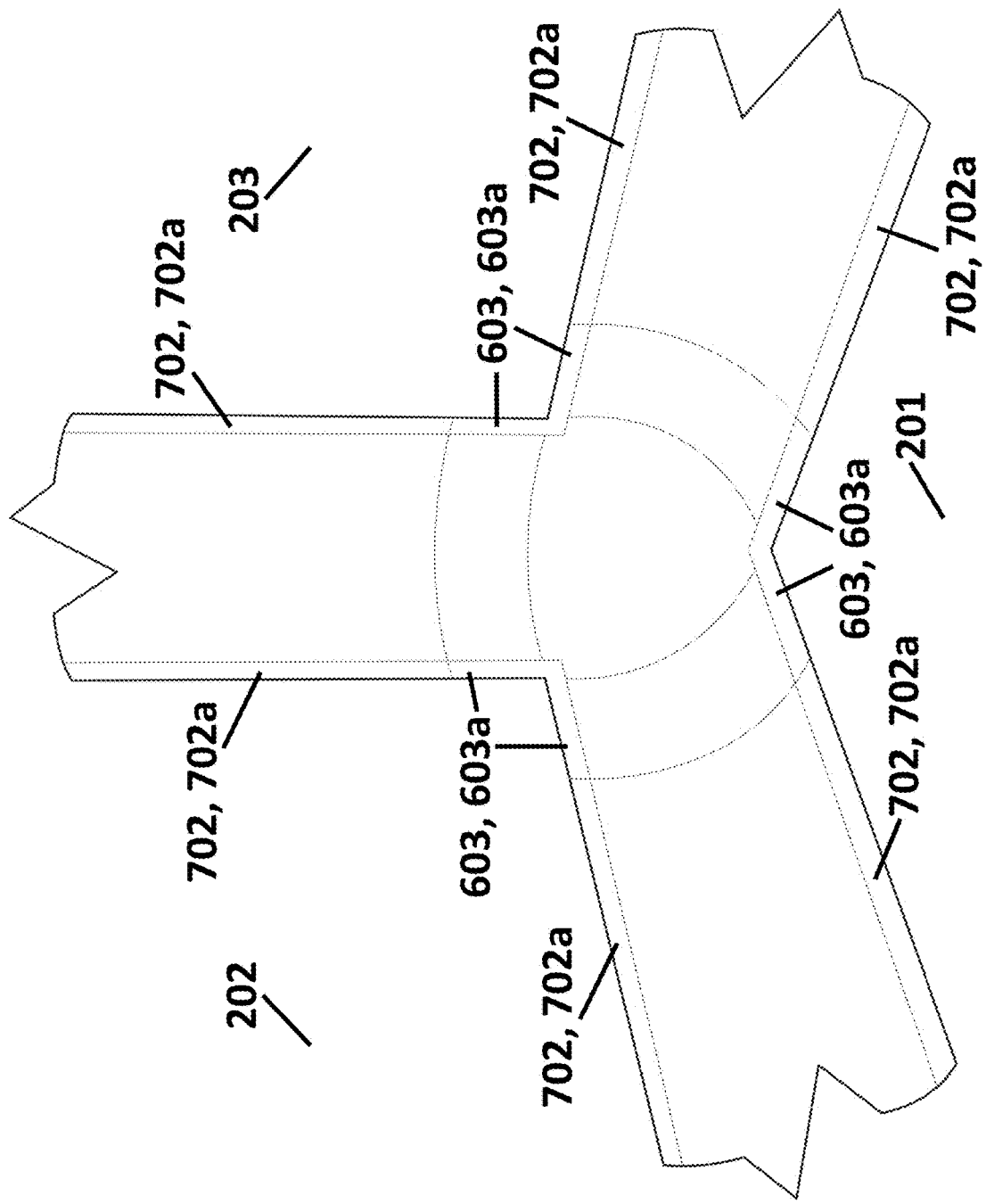
FIG. 18 is another perspective view of the outward-facing concave side of the CCP and three BCPs for EMB2.

EMB2/EMB3 CCP AND EMB2 BCP ASSEMBLY: FIGS. 17-18 show the two perspectives of the CCP and BCP assembly for EMB2 in the analogous manner shown and described for EMB1 in FIGS. 8-9. As mentioned, internally, the difference between FIGS. 17-18 (EMB2) from FIGS. 8-9 (EMB1) is the lack of EMB1's slit 304 and alignment channel 305 in EMB2's CCP flaps 302 as well as the slit 404 and alignment channel 405 in EMB2's BCP's curved channel portion 701.

Figure 19:
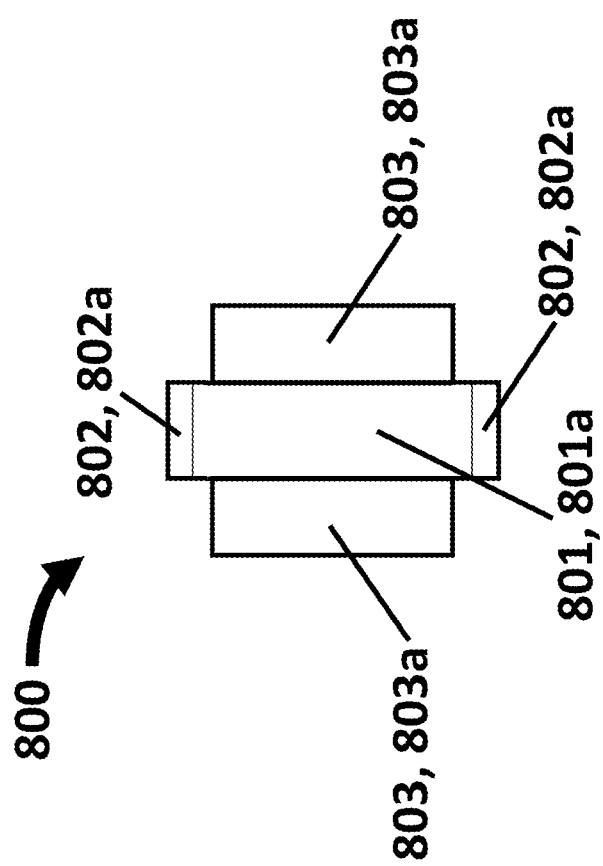
FIG. 19 is an orthogonal view of the outward-facing concave side of a CAP with a pair of underside flanges for EMB2.

EMB2's DUAL UNDERSIDE FLANGE COVING ADAPTOR PIECE (CAP): The CAP 800 for EMB2, as shown in FIG. 19, serves the same purpose as the CAP 500 for EMB1, except instead of a pair of male extension portions 503, a pair of underside flanges 803 is used. The cross-section of said underside flanges 803 is identical to the underside flanges 703 for EMB2's BCP, as shown in FIG. 16. Table 3 summarizes the mapping of EMB2's CAP reference numbers to EMB1's CAP reference numbers so the description for equivalent EMB1 elements may be referred to for elucidation of each of EMB2's CAP structure and functionalities without the need to be repeated.

TABLE 3

Mapping of EMB2 BCP Reference Numbers to EMB1 CAP Reference Numbers

| Part Description | EMB2 Ref. Number | EMB1 Ref. Number |
| --- | --- | --- |
| Curved center portion | 801 | 501 |
| Outward-facing side of curved center portion | 801a | 501a |
| Wall-facing side of curved center portion | 801b | 501b |
| Non-radiused lip | 802 | 502 |
| Outward-facing side of non-radiused lip | 802a | 502a |
| Wall-facing side of non-radiused lip | 802b | 502b |

Figure 20:
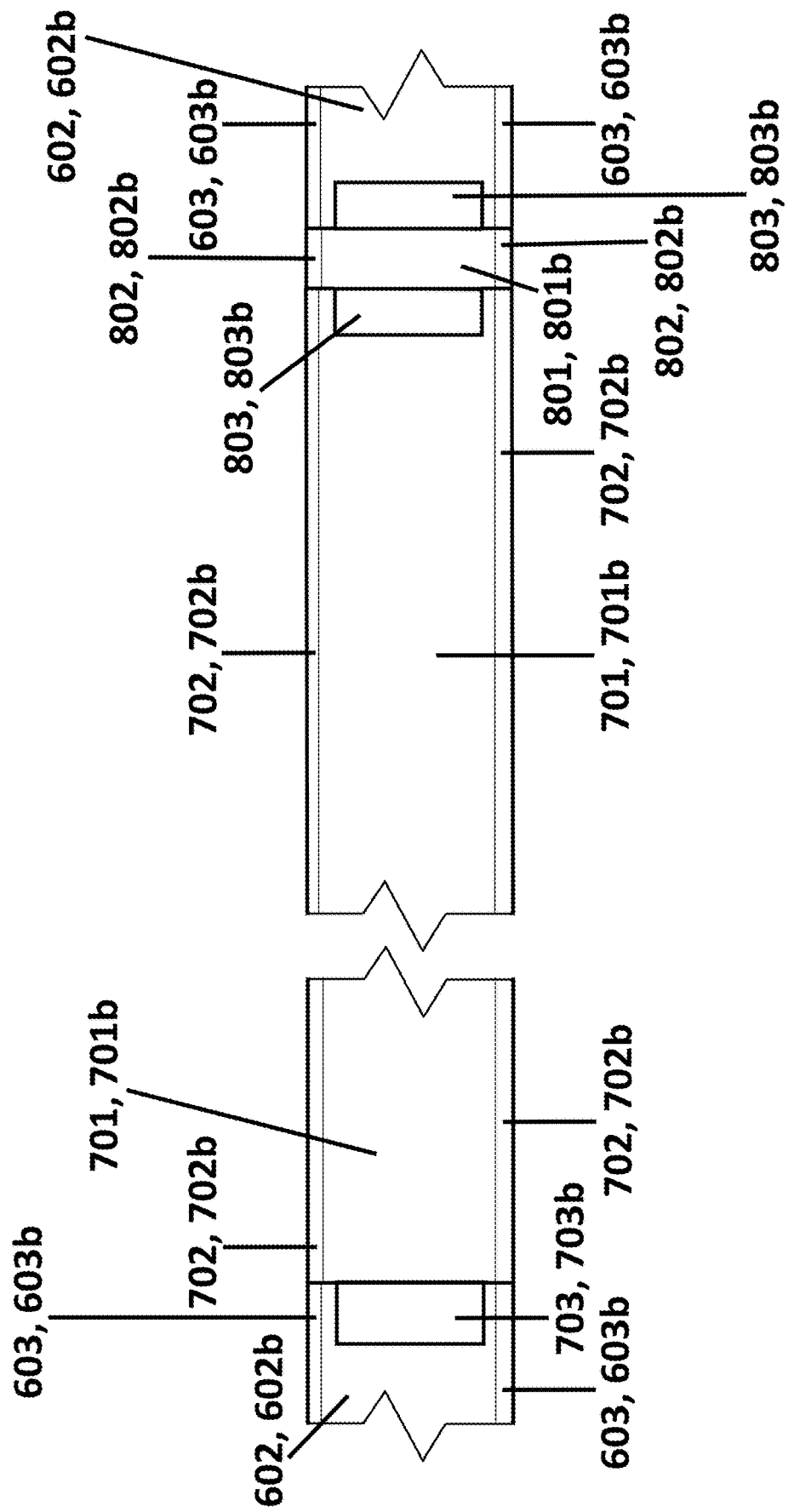
FIG. 20 is an orthogonal view of the wall-facing convex side of an assembly of flaps from two different CCPs, partial BCPs, and CAP for EMB2.

FIG. 20 shows an orthogonal wall-facing view of EMB2 system components assembled together to show the relation of the CCPs 600, BCPs 700, and CAP 800 from one wall corner to another wall corner over one wall-to-wall edge. Note, the method for coving using the EMB2 system is similar to coving with the EMB1 system except the underside flanges 703, 803 are not disposed through a channel, but the outward-facing concave side 703a of each engaging underside flanges is "cupped" around the wall-facing side 602b, 701b near the open end of the CCP 600 or BCP 700 being engaged.

Asymmetrical Panel-to-Panel Connector of EMB3 and EMB4

Figure 21:
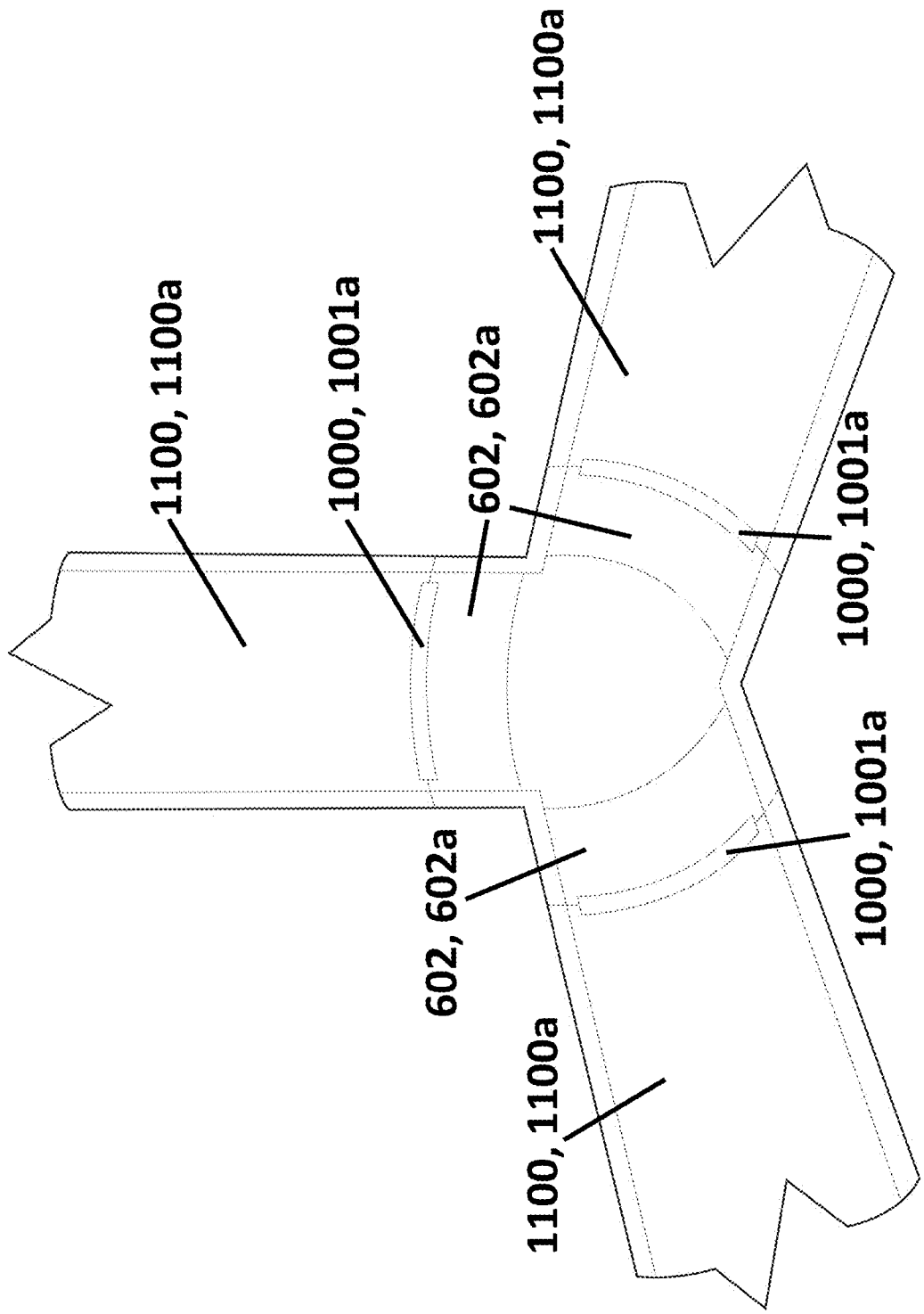
FIG. 21 is a perspective view of the outward-facing concave side of the CCP and three BCPs for EMB3 and EMB4 connected together by an asymmetrical panel-to-panel connector.

FIG. 21 shows the outward-facing concave side of EMB3's CCP-BCP subassembly 600, 1100. The concave outward appearance is identical to that of EMB1 (FIG. 9) and EMB2 (FIG. 18) except for the plurality of connectors 1000 (outward-facing side shown as 1001a in FIGS. 21-23B while the wall-facing side is shown as 1001b in FIGS. 22-23B) that each is engaged to and align the open end of a CCP flap 604 and lateral extent of a BCP 1100 or the lateral extents of two separate BCPs 1100. Each connector 1000 preferably runs along a substantial portion of the flap's 602 or BCP's 1000 arc length.

Figure 22:
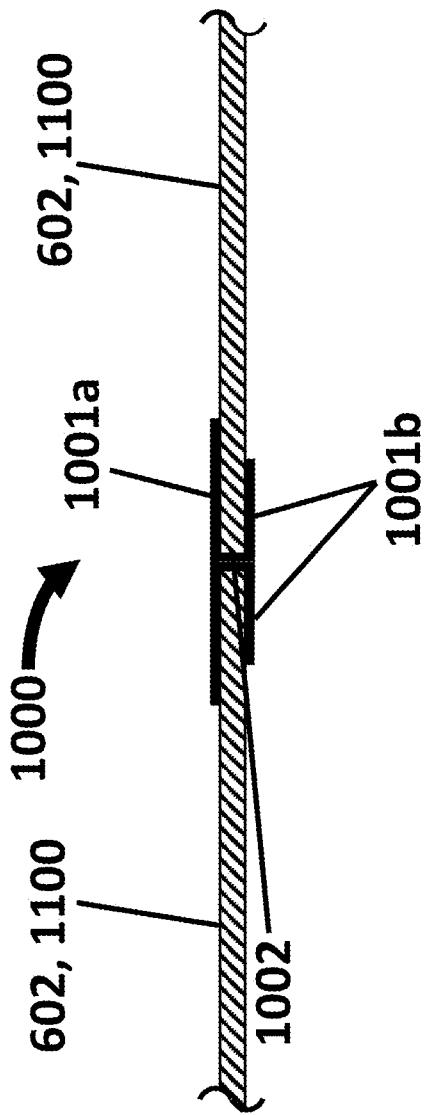
FIG. 22 shows an orthogonal cross-sectional view of two notional pieces or elements of pieces of the EMB3 and EMB4 system embodiments adjoined by the asymmetrical panel-to-panel connector.
Figure 23:
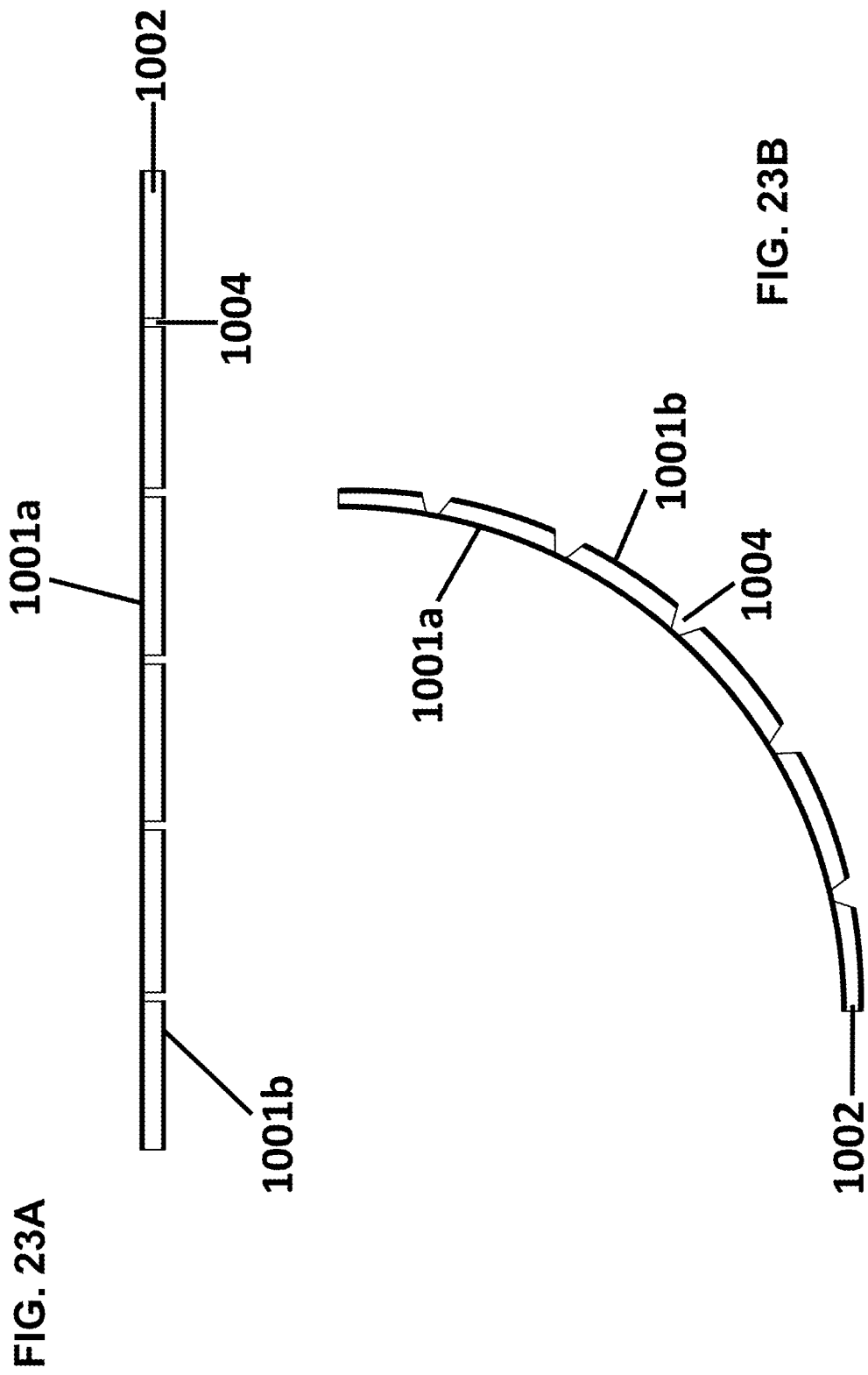
FIG. 23A shows an orthogonal side view of the asymmetrical panel-to-panel connector in a non-curved flat state and illustrates periodic convex wall-facing side panel flanges and spine to more smoothly accommodate the different radii of curvatures between outward-facing concave side and wall-facing convex side.
FIG. 23B shows an orthogonal side view of the asymmetrical panel-to-panel connector in a curved state.

FIG. 22 shows a cross-sectional view of the connector 1000 and two notional pieces or elements of pieces 602, 1100 (alternatively termed "panel" hereinafter). The connector 1000 is comprised of a thin and initially flat outward-facing flange 1001a, a thin and initially flat wall-facing flange 1001b, and a thin centrally located spine 1002 connecting the two flanges 1001a and 1001b. The outward-facing 1001a and wall-facing 1001b flanges need not be the same length but each should be at least approximately a centimeter long from each side of the spine 1002. The result is a slender and substantially "H" cross-sectional profile, where two laterally opposed cavities are formed for the notional panels 602, 1100 are accommodated in a slip-fit manner. To facilitate initial entry of the panels 602, 1100 into the cavity, the entrance may be relatively slightly larger by an infinitesimally small amount or internally flared out (not shown). Alternatively or additionally, the arc length dimensions of the flap 602 or BCP 1100 may be slightly tapered narrow (not shown) to assist entry of the panels 602, 1100 into the cavity.

The connector 1000 is preferably made of plastic, vinyl, or equivalent and rigid enough to hold panels 602, 1100 but elastic enough to be bent. Since the radius of curvature varies between the outward-facing 1001a and wall-facing 1001b flanges, there is a plurality of small gaps or breaks 1004 along the length of the connector 1000 that runs through the wall-facing flange 1001b and spine 1002 but not the outward-facing flange 1001a, as shown in FIG. 23A. This is what makes the present connector 1000 asymmetrical and unlike H-cross-section panel-to-panel connectors in the marketplace that are meant to stay flat.

FIG. 23B shows the connector 1000 after bending and shaped when installed for coving. The illustration shows how the gap 1004 splays out to reflect the differing radius of curvature between the two flanges 1001a, 1001b. This connector 1000 is used for connecting two pieces in EMB3 and EMB4.

Note the borders of the connector 1000 are delineated from the surrounding flap 602 or BCP 1100 in the drawing (FIG. 21) with a thin black line. In practice, the connector should not be distinguishable and is blended with the surrounding panels 602, 1100 with an equivalent surface finish (i.e., color and texture).

The finite lateral thickness of the spine 1002 creates the potential of a small gap between two adjacent panels where no connector 1000 is present (e.g., near the lip of the flap and BCP). Hence, the CCP flap 602 and the open end of the BCP 1100 can be notched (not shown) where the connector 1000 is supposed to be engaged to eliminate the possibility of gaps. The depth of the notch for each panel 602, 1100 is the half-lateral-span of the spine, where the lateral dimension is parallel to the direction said panels engage the connector.

Embodiment EMB4

Figure 24:
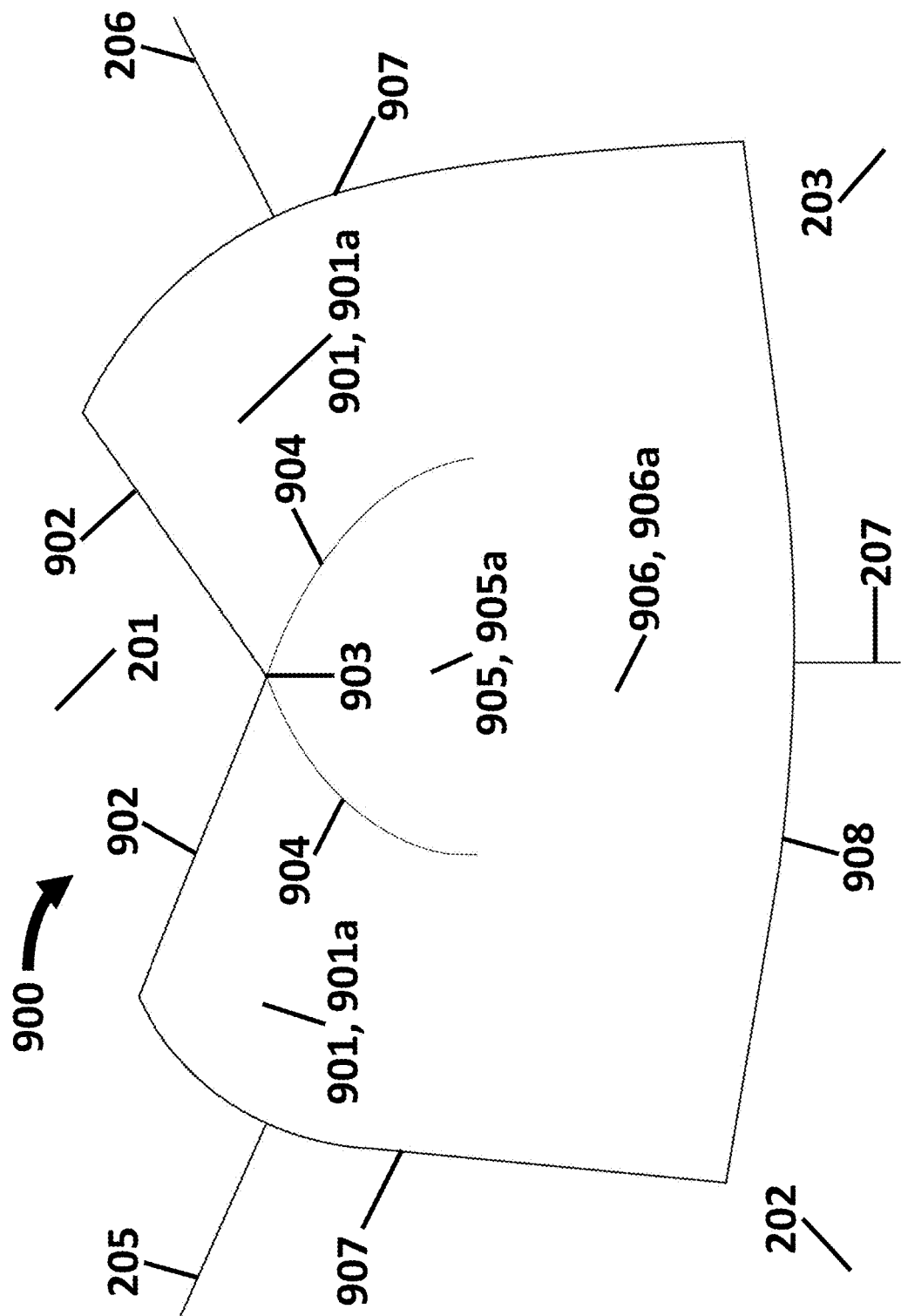
FIG. 24 is a perspective view of the outward-facing concave side of a CCP for the embodiment EMB4.

The alternative system embodiment, EMB4, primarily relates to another variation of the CCP 900, as shown in FIG. 24 when installed to cove a corner and nearby wall edges of a room. FIG. 24 depicts wall 201 as a ceiling, but if this illustration is turned upside down, it can equivalently represent a coved corner and wall edges next to the floor of a room. Furthermore, a ceiling 201 or floor can equivalently be considered as another wall, but for illustrative brevity, the explanation will hereinafter declare surface 201 as a ceiling.

The exemplary corner of a room comprises a ceiling 201 and side walls 202, 203. Adjacent sidewalls 202, 203 or a sidewall and ceiling 201 are adjoined to form wall edges 205-207, as shown in FIG. 24. The exemplary CCP 900 as installed comprises a curved panel or board, further comprising a plurality of radiused and inward-turning lateral flaps 901. The lateral flaps 901 have edges 902 that are attachable to the ceiling 201 and whose inside corners converge together at point 903 to form a V-angle. This point 903, also marks a common termination point for a plurality of seams 904 that bound a center flap 905 that is radiused like the center pocket 301, 601 other CCP embodiments previously described, where this type of radiusing is about a point, and not an axis. Before attaching the CCP 900 to the walls 201-203, the seams 904 are fully closed such that the lateral 901 and center 905 flaps form a continuous surface. An imaginary line connecting the open ends of each seam 904 closes a polygon whose orthogonal projection forms a substantially triangular shape.

FIG. 24 depicts said seams 904 as lines for illustrative purposes of a CCP embodiment 900 that is initially constructed by the end-user from a flat panel or board. However, in practice, the seams 904 are not visibly apparent. The installable version of the CCP 900 has the lateral flaps 901 joined with the center flap 905 at the seams.

The seams 904 run down a substantial portion of the panel's longitudinal extent to approximately where the CCP 900 curves away from the side walls 202, 203. The portion of the CCP 900 with no seams across its lateral span, hereinafter called "CCP band," 906 is radiused about a single axis that is substantially parallel to one (vertical in the present illustration) edge 207 and runs orthogonal to the ceiling 201. This allows wall 202 to blend into the wall 203 seamlessly visually.

Alternative embodiments of this CCP 900 include a prefabricated or molded element where no seams are ever formed nor present, yet the seams 904 are illustrated in the present disclosure to convey the distinctions between the center flap 905 that has a radius of curvature about a single point, lateral flaps 901 that have a radius of curvature about two different axes, and the CCP band 906 which has a radius of curvature about another distinct axis.

The radius of curvature of the lateral flaps 901, center flap 905, and CCP band 906 is at least 0.1 meters. However, to obtain a properly diffuse lighting effect, the radius of curvature is preferably at least 0.3 meters, with the most diffuse effect achievable using a radius of curvature of at least 1.0 meters. FIG. 24 shows the outward-facing concave side of the CCP 900 and thus the outward-facing concave sides of the lateral flaps 901a, center flap 905a, and CCP band 906a.

The lateral extent of said lateral flaps 901 and CCP band 906 are bounded on each end by edges 907. The remaining open end of said CCP band 906 is edge 908.

Method of Constructing the CCP in EMB4

The CCP 900 of EMB4 can be either prefabricated or hand-constructed by a non-expert using basic household tools. The following details the steps to hand construct the CCP 900 of EMB4 from a material with one or more layers of posterboard, cardboard, thin paper, paper, or wood pulp and is plastically deformable or does not return to its original form when deformed beyond a certain threshold.

As a preliminary step to the below method, a starting element for the hand-constructible embodiment of the CCP 900, termed "base panel" hereinafter, needs to be acquired. The base panel material is preferably thin and easily cuttable with scissors or equivalent by a human and foldable within the aforementioned range of radii of curvature with forming creases.

Figure 25:
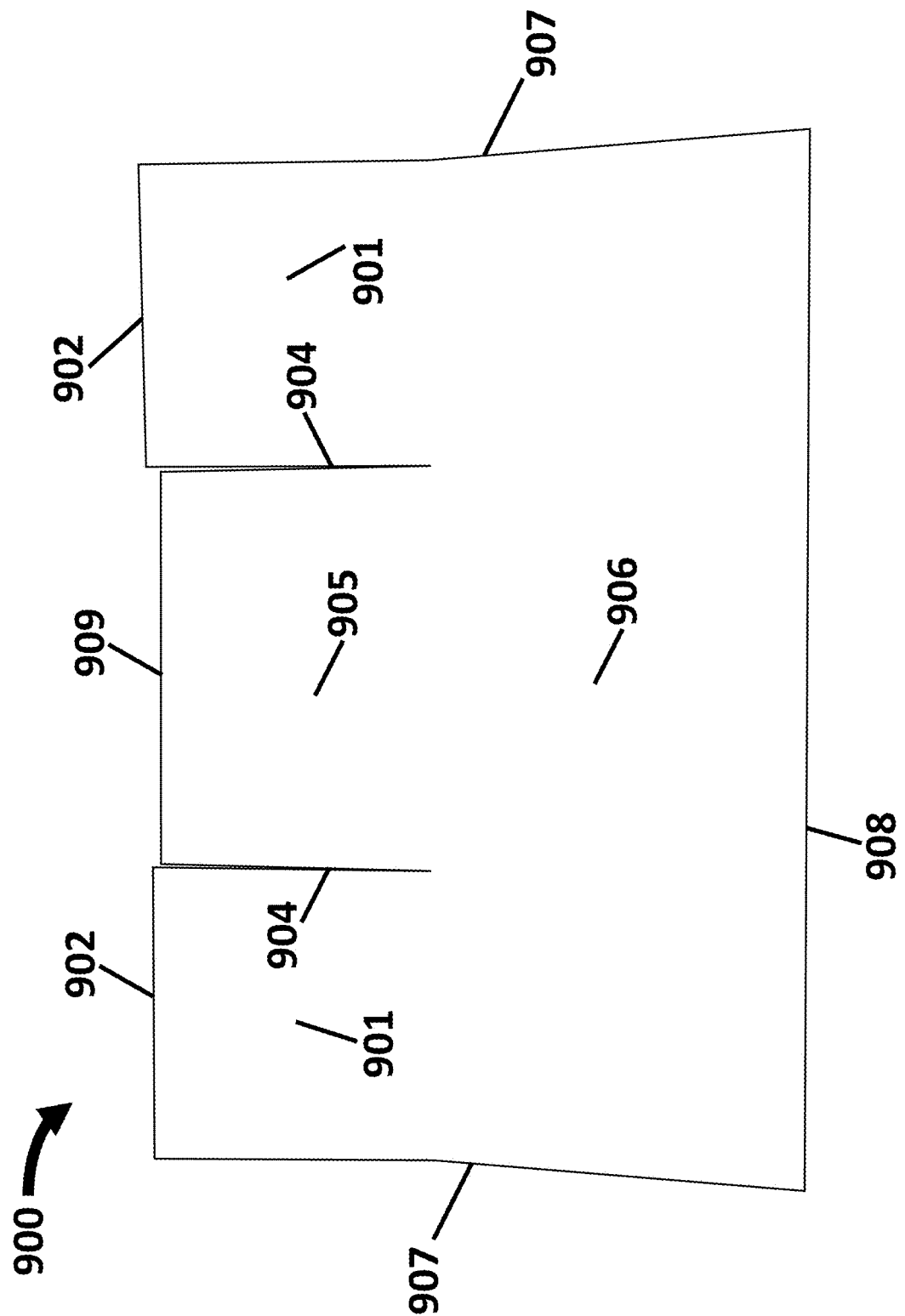
FIG. 25 is a perspective view of the result of Step 1's flap creation toward fabricating the CCP for embodiment EMB4.

The base panel is a thin, substantially rectangular or square. The exemplary base panel has a height-to-width aspect ratio ranging from 1/2 to 3/4 but preferably approximately 2/3 and an absolute width of approximately 17 inches for the exemplary case. For CCP 900 embodiments attachable to a wall or surface using double-sided tape initially with an adhesive backing, where strips of double-sided tape with adhesive backing on one side are initially retained and are preferably applied along a substantial or entire portion of the periphery (as shown in FIG. 25) of said CCP 900 near edges 902, 907, 908, 909.

STEP 1 (Ref. FIG. 25): With scissors or equivalent cutting tool, make two parallel cuts 904 perpendicularly or longitudinally into one of the edges to create three flaps: two lateral 901 and one center 905. Each cut is preferably and approximately $\frac{1}{3}^{rd}$ the height of the base panel but a range can be used as long as it is approximately between $\frac{1}{5}^{th}$ to $\frac{4}{5}^{th}$ the height of the base panel. The width of each flap 901, 905 can be equal, but at the least, the lateral flaps 901 are preferably of equivalent width as shown. The width of all flaps 901, 905 preferably do not vary by more than 50%; i.e., the narrowest flap is not less than 50% the width of the widest flap. The actual absolute dimensions to be used depend on the intended effect (sharper or more diffuse blending) and thus the radii of curvature. The portion that is not cut across its lateral span is the CCP band 906.

Figure 26:
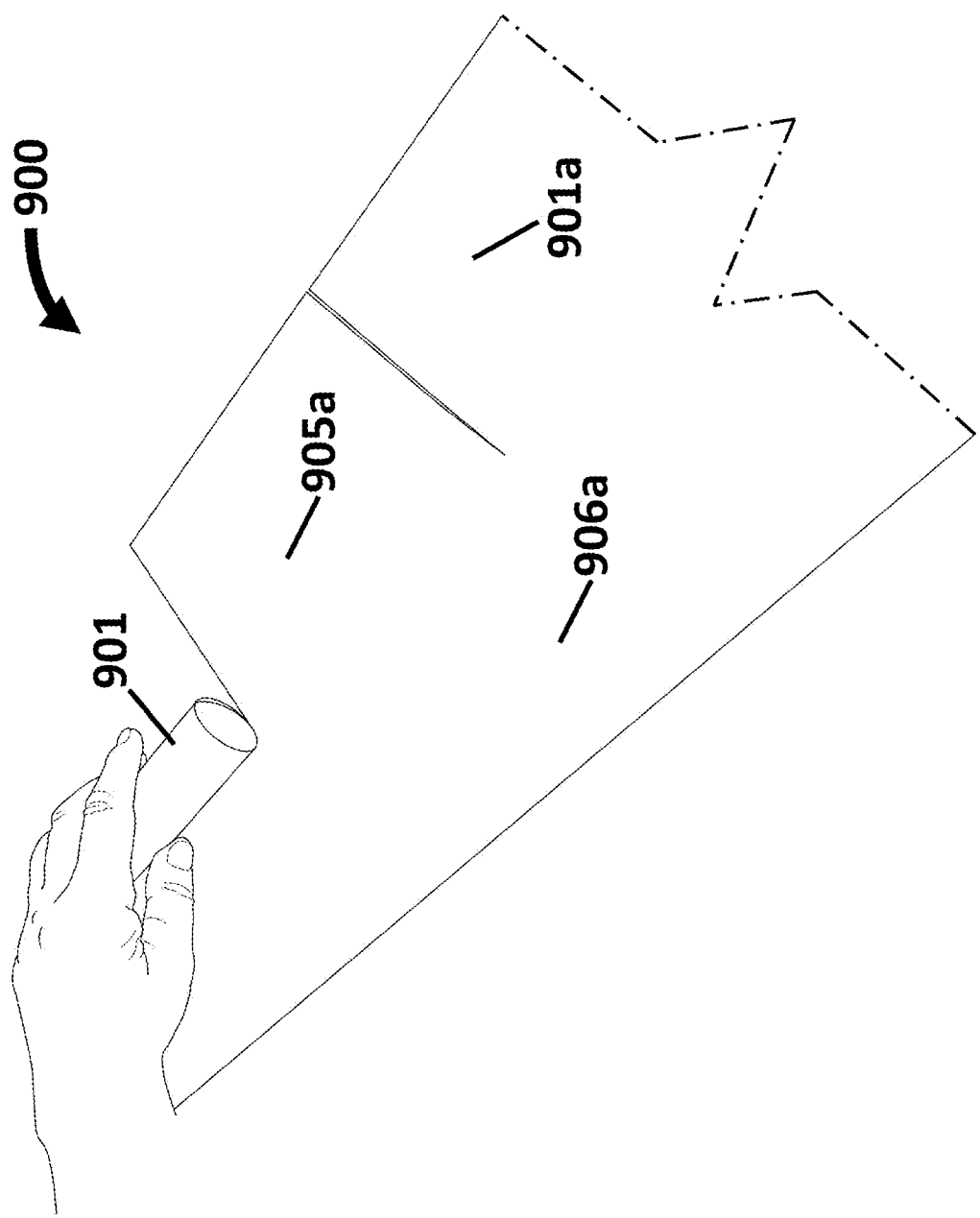
FIG. 26 is a perspective view of Step 2's process of longitudinally radiusing outboard flaps toward fabricating the CCP for embodiment EMB4.
Figure 27:
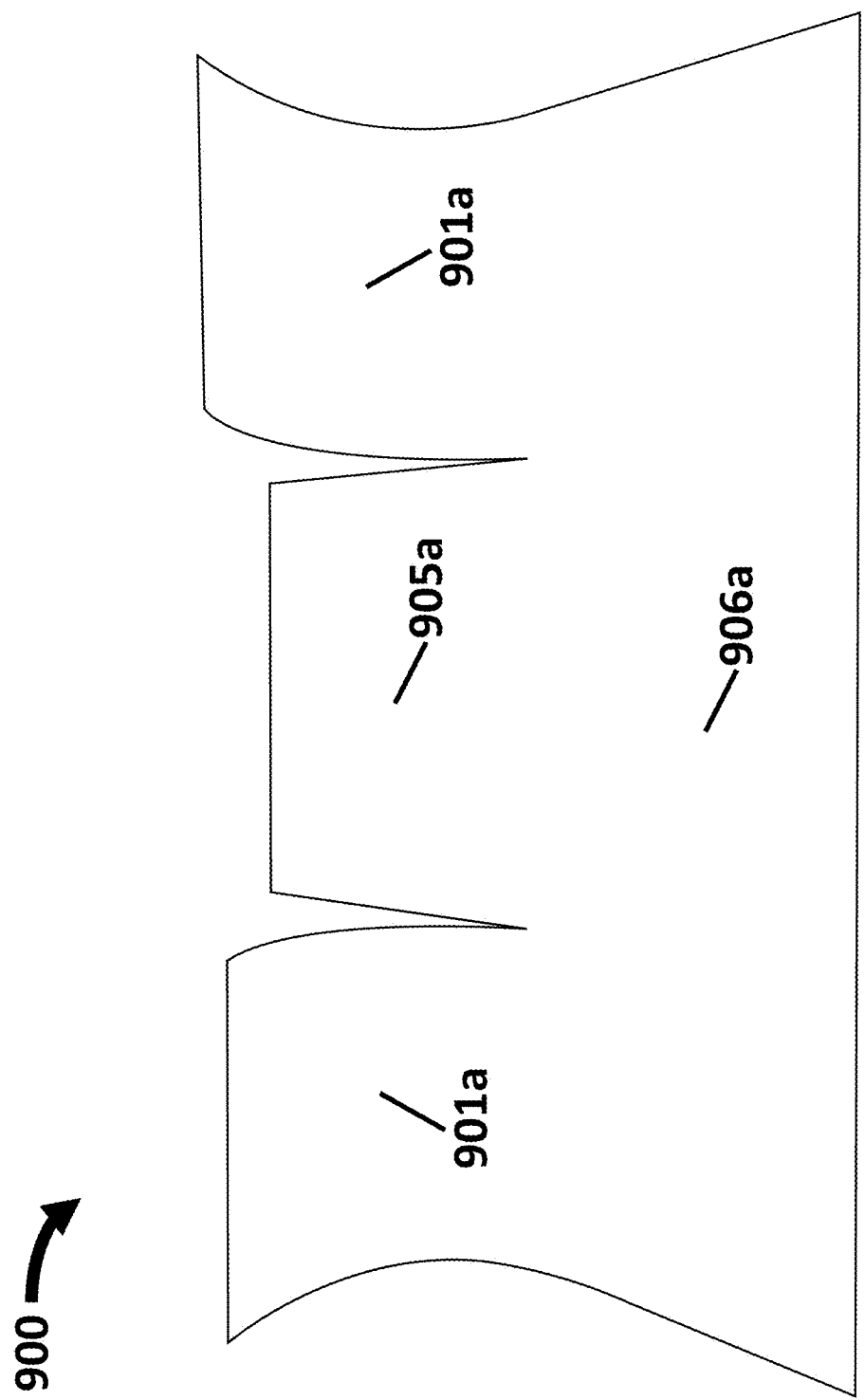
FIG. 27 is a perspective view of the result of Step 2 in fabricating the CCP for embodiment EMB4.

STEP 2 (Ref. FIGS. 26-27): Roll each of the lateral flaps 901 by hand in the same rotational direction. The circular cross-sectional diameter of the flaps 901 while being rolled is on the order of a large coin (i.e., U.S. quarter or half-dollar) or an inch or a few. This dimension should be enough to deform the flaps 901 plastically or permanently so that it maintains a curved profile close to the radius of curvature of the final, installable CCP 900.

Figure 28:
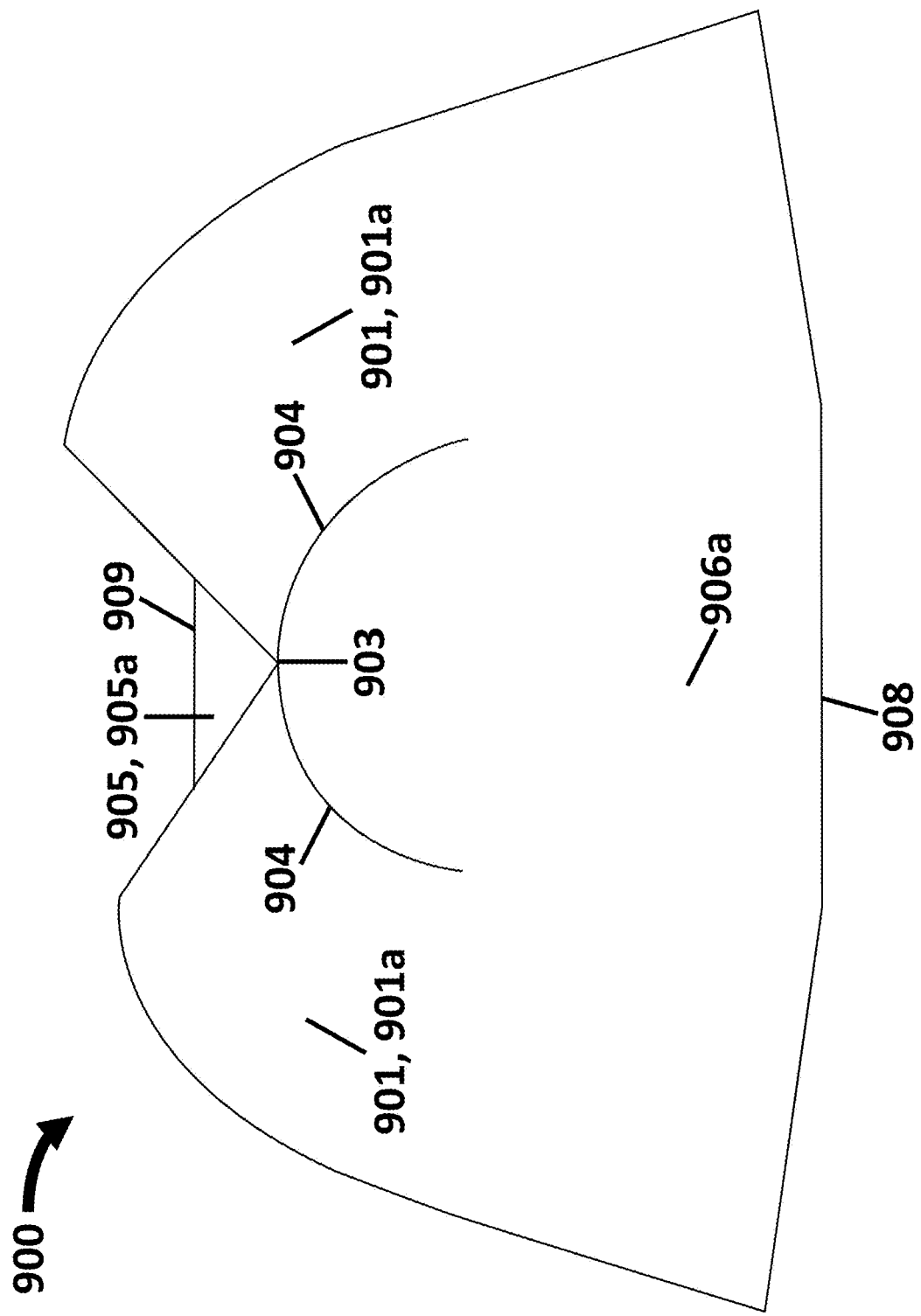
FIG. 28 is a perspective concave side view of Step 3's process of laterally radiusing and connecting the inside lateral flap corners toward fabricating the CCP for embodiment EMB4.

STEP 3 (Ref. FIG. 28): Fold the base panel about the centerline axis that runs along the base panel's height from edge 908 to edge 909. The lateral flaps 901 need to be folded until the inside corner of each flap 901 touches at a point 903. The backside of the flaps 901 at the point 903 are attached together, preferably with a tape or equivalent adhesive. The center flap 905 remains in its non-angled, unbent neutral position for now.

Figure 29:
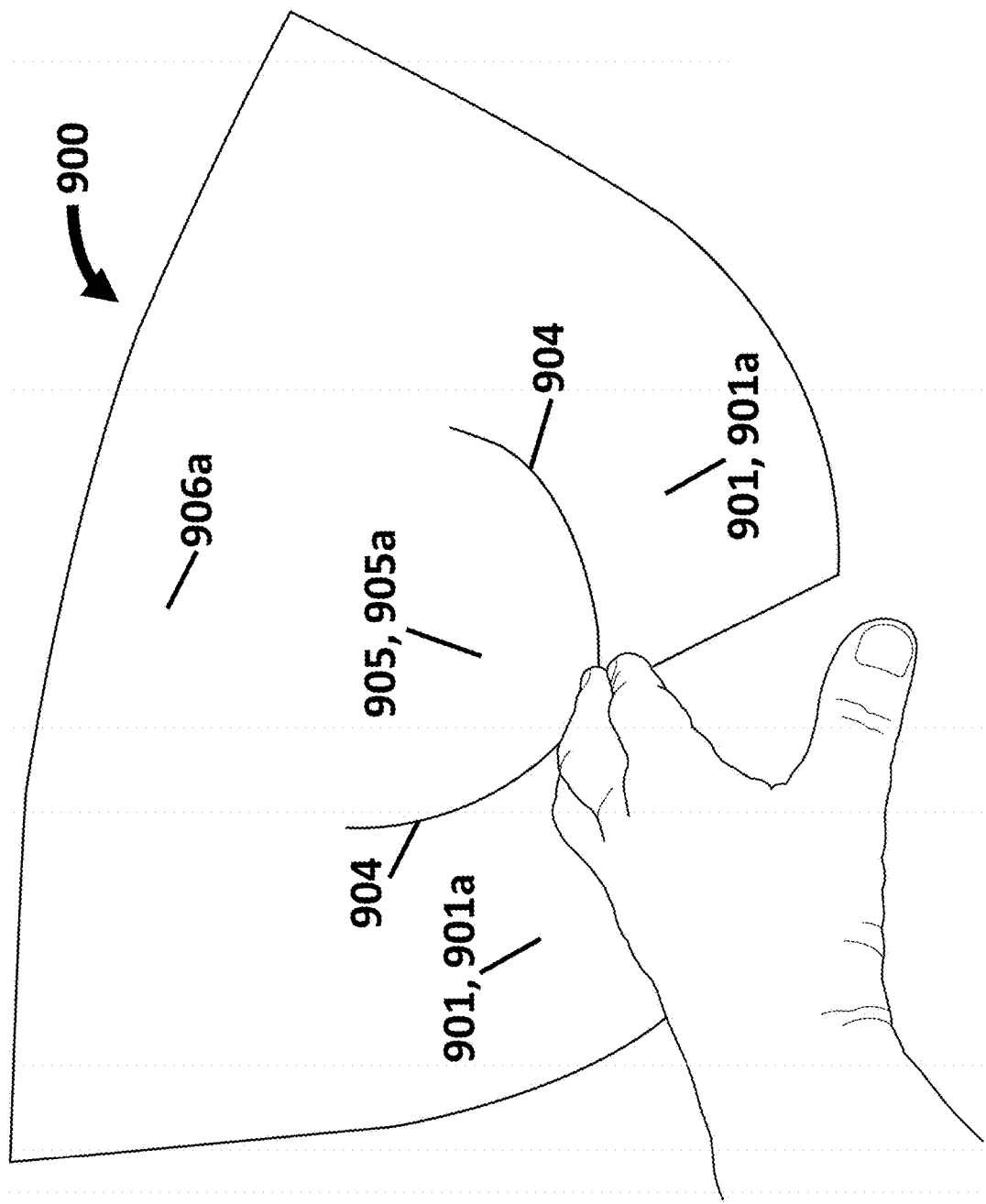
FIG. 29 is a perspective concave side view of the CCP panel orientation for center flap trimming in Step 4 of fabricating the CCP for embodiment EMB4.
Figure 30:
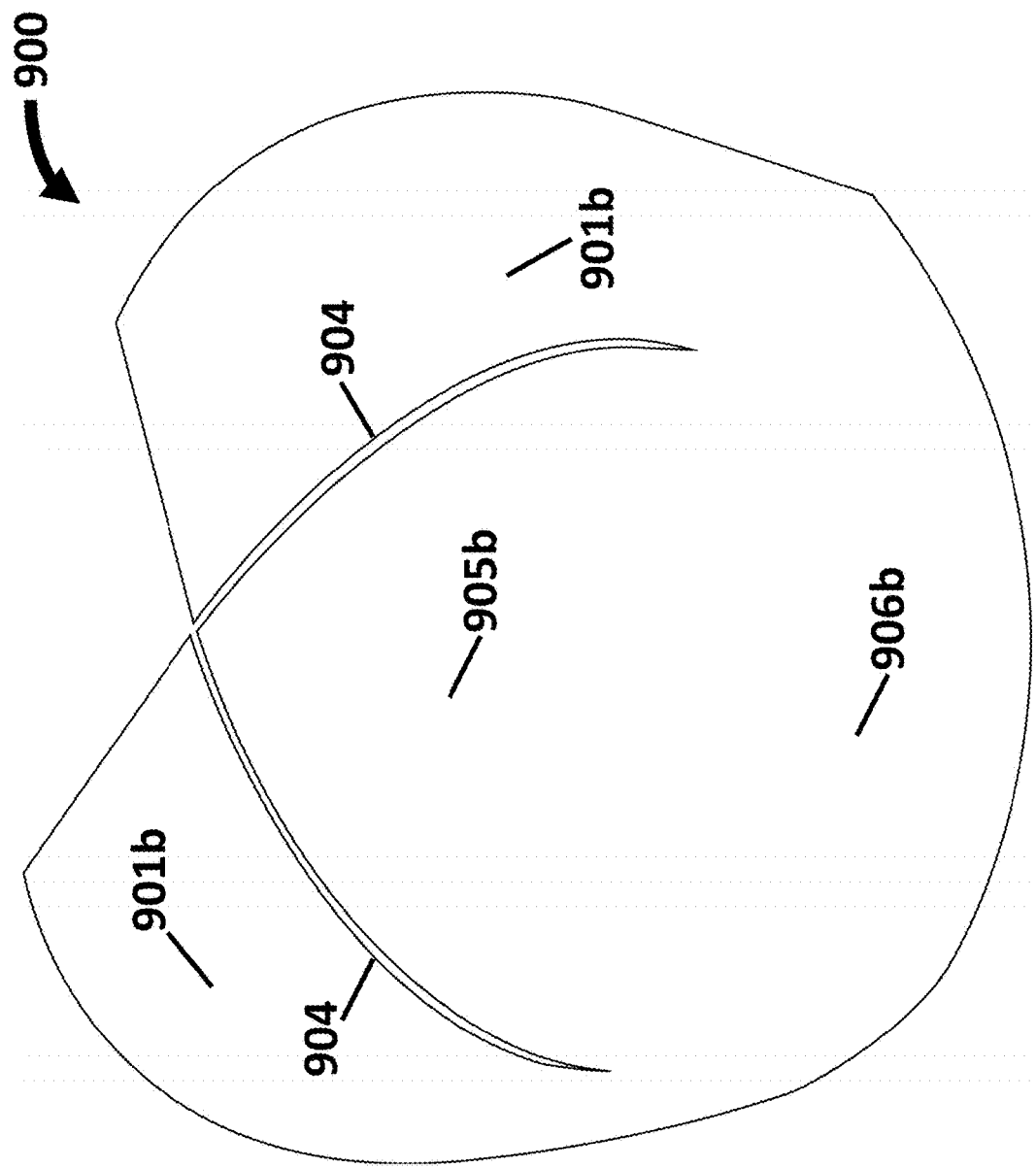
FIG. 30 is a perspective convex side view of the CCP panel and the result of Step 4 after center flap trimming with a view of the CCP flap seams just before joining the flaps together.

STEP 4: (Ref. FIGS. 29-30): The base panel is preferably reoriented and substantially upright so that the backside of the lateral 901 and center 905 flaps are resting on a flat surface (not shown). Initially, portions of the center flap 905 overlap and are placed underneath the lateral flaps 901. Following this, the excess, overlapping portions of the center flap 905 are trimmed away. The trimming is along each arc 904 defined by the original cuts performed in Step 1 to split the center 905 and lateral flaps 901. The preferred cutting tool is an X-Acto® knife, box cutter, or equivalent. FIG. 30 shows the eventual wall-facing convex side surfaces 901*b*, 905*b*, 906*b* of the CCP 900 after trimming but before joining the flaps 901, 905 together at the seams 904.

Figure 31:
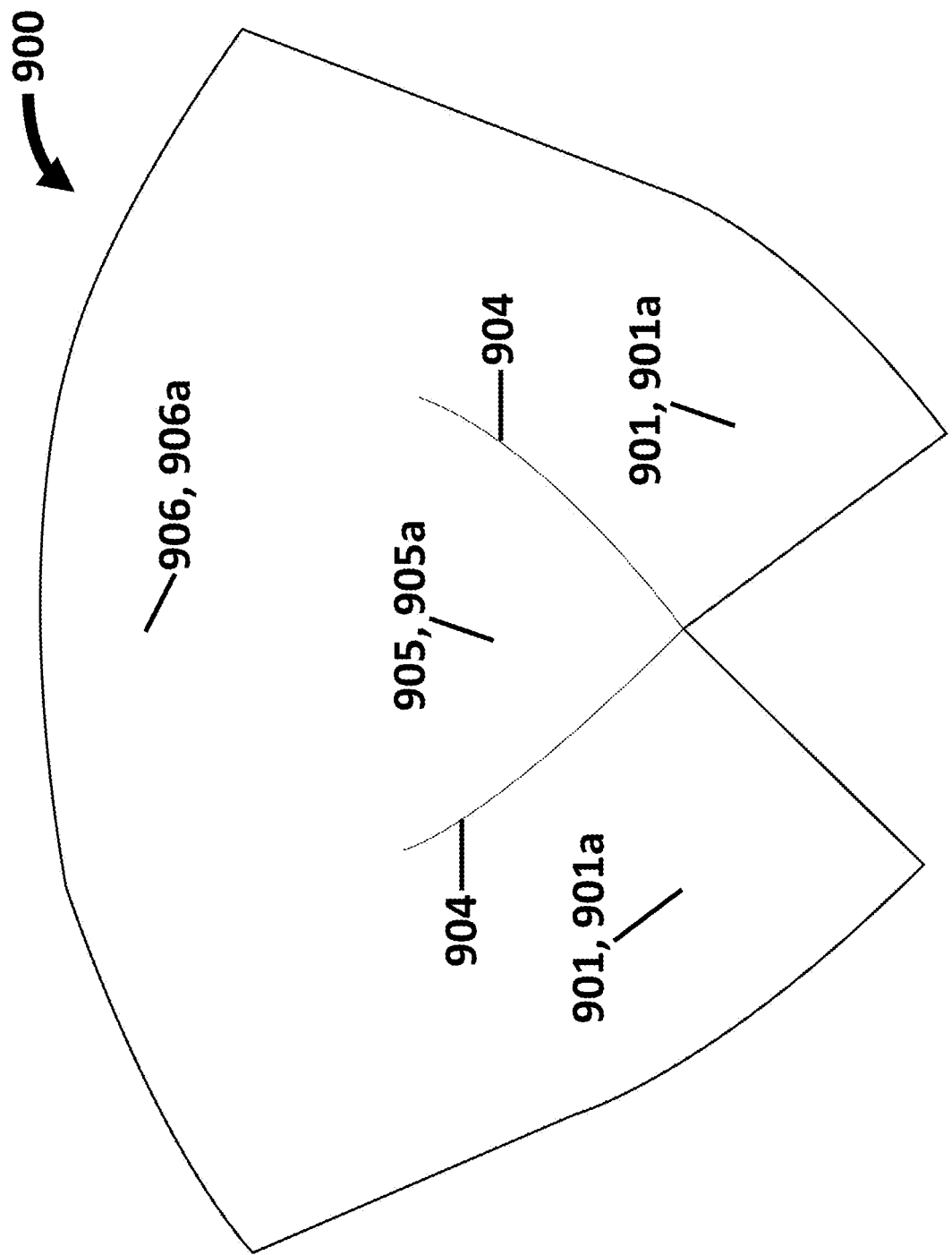
FIG. 31 is a perspective concave side view of the result of the final Step 5 in fabricating the CCP for embodiment EMB4.

STEP 5: (Ref. FIGS. 30-31): The final step in constructing the CCP 900 of EMB4 is to join the flaps 901, 905 at the cut arcs/seams 904 using tape, glue, or equivalent. FIG. 31 shows the result of this final step from the outward-facing concave side of the CCP 900. As previously mentioned, the seams 904 are not necessarily visibly apparent, especially from a few feet's distance after installation on a room wall.

The above listed steps cover the hand construction of the CCP 900 of EMB4. The BCP 1100 which connects to this embodiment of the CCP is that previously described for EMB3, which can also be constructed by hand from basic household measurement and cutting tools. Therefore, as a whole, the main elements (900, 1100) of EMB4 can be constructed by hand by non-experts in wall coving or general handyman tasks, leaving the connector 1000 that may require prefabrication.

SUMMARY OF EMBODIMENTS

Table 4 provides a summary of key geometric features for each associated piece and applicability for each overall system embodiment (EMB1, EMB2, EMB3, EMB4). As mentioned, EMB1 is the most complicated, with the highest manufacturing precision requirements, and conceivably the costliest to manufacture but is also potentially the easiest to assemble. EMB3 and EMB4 are the most basic overall embodiments that each are least costly to produce, but potentially requires more effort by the end user to achieve the seamless piece-to-piece transition effect. EMB4 is further distinguished by having embodiments whose main pieces (900, 1100) are hand-constructible by non-experts in wall coving or general handyman tasks using basic household measurement and cutting tools.

dimensional stability across the range of room temperatures expected. The outward-facing surfaces should have a finish that is matched to the wall including color, topology, texture, and sheen, such as flat, eggshell, satin, and semi-gloss and the material needs to allow the proper finish effect to be realized and retained. The combination of material and dimensions should support a semi-rigid construction, with some degree of elastic flex allowed to permit fulfillment in the presence of finite manufacturing and installation tolerances. Other candidate materials may comprise nylon and polystyrene. Several layers of thin paper, paper or wood pulp, or fibers laminated together may also be used to create a rigid structure that achieves all construction objectives. Alternatively, the CCP 300, 600, 900 (prefabricated embodiment) may be made from a non-elastic material like Styrofoam®, Lexan®, or harder plastic is also suitable if geometric tolerance is less important.

The BCP 400, 700, 1100 is preferably made mostly from one or more layers of posterboard, cardboard, thin paper, paper or wood pulp, or fibers laminated together with an elastic binder, vinyl, or equivalent. The thickness of the curved panel portion 401, 701 of the BCP or entire BCP 1100 may be in the range of 0.1 to 2.0 mm. The BCP 400, 700, 1100 should have some degree of elastic flexibility to conform to imperfect, non-true wall surfaces, practical manufacturing tolerances of the CCP 300, 600, 900 and CAP 500, 800 as well as installation imperfections and variations on the part of the user. Furthermore, the use of paper-based, vinyl, or equivalent materials allows the BCP's curved panel portion 401, 701 or EMB3/EMB4 BCP 1100 to be cut to length with a common paper cutter, heavy-duty pair of scissors, or equivalent cutting tool and means without fraying or breaking. The male extension portion 403 or underside flange 703 may be a solid paper-based material made from many layers or alternatively, a plastic, vinyl, Lexan®, or polycarbonate.

As mentioned, the adhesive, if used for affixing the various pieces 300, 400, 500, 600, 700, 800, 900, 1100 to a wall, is preferably sticky tape with a non-adhesive backing that is peelable during coving. For this embodiment, a thin double-sided mounting tape may be applied to the convex wall-facing side of the lips 303*b*, 402*b*, 502*b*, 603*b*, 702*b*,

TABLE 4

Summary of Features for Each System Embodiment

| FEATURE, ASSOCIATED PIECE | EMB1 | EMB2 | EMB3 | EMB4 |
|---|---|---|---|---|
| Radiused center pocket or flap, CCP | ✓ | ✓ | ✓ | ✓ |
| Radiused flaps or lateral flaps, CCP | ✓ | ✓ | ✓ | ✓ |
| Trimmable curved panel portion, BCP | ✓ | ✓ | ✓ | ✓ |
| Male extension portion, BCP | ✓ | | | |
| Underside flange, BCP | | ✓ | | |
| Male extensions portions, CAP | ✓ | | | |
| Underside flanges, CAP | | ✓ | | |
| Female side slit, CCP and BCP | ✓ | | | |
| Alignment channel, CCP and BCP | ✓ | | | |
| Non-radiused wall-attachable lips of pieces | ✓ | ✓ | ✓ | ✓ |
| Hand-constructible BCP and/or CCP from flat panel | | | BCP only | ✓ |
| Asymmetrical panel-to-panel connector | | | ✓ | ✓ |

Additional Details on Materials and Construction

The CCP 300, 600, 900 (prefabricated embodiment) and CAP 500, 800 are preferably made from molded plastic, vinyl, or polycarbonate with high strength to permit thin walls on the order of 0.2 to a couple of millimeters and good

802*b*, near the edges 902, 907, 908 of CCP 900 and edges of BCP 1100. Alternative embodiments may use an adhesive that is only activated after being cured by a light of a certain wavelength, heat, or humidity. This allows some adjustments to be performed before the pieces 300, 400, 500, 600, 700, 800, 900, 1100 are finally bonded to the wall.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

Affordable Cyc Wall Systems is a registered trademark of Todd A. Dean.

P PUREPOXY® is a registered trademark of REVETE-MENTS VORTEX INC.

MyStudio® is a registered trademark of VON TAGEN, FREDERICK, MR.

EASIFRAME® is a registered trademark of Printaly Pty Ltd.

Styrofoam® is a registered trademark of The Dow Chemical Company.

Lexan® is a registered trademark of Sabic Global Technologies, B.V.

X-Acto® is a registered trademark of Sanford, L.P.

What is claimed is:

1. A system for coving a room into a cyclorama, comprising:
a concavo-convex corner coving piece (CCP);
said CCP having a radiused center pocket with a concave outward-facing side and a convex wall-facing side;
wherein a plurality of edges of said center pocket forms a substantially triangular shape when viewed along an axis orthogonal to the centroid of the center pocket;
said CCP having a plurality of radiused flaps, wherein each flap extends outward from one of the edges of the center pocket;
said flaps each having a radius of curvature identical to a radius of curvature of the center pocket;
a concavo-convex bridging coving piece (BCP);
said BCP having a curved panel portion with a concave outward-facing side and a convex wall-facing side;
said curved panel portion having two sets of two parallel edges, wherein one set of the two sets of two parallel edges is perpendicular to the other set of the two sets of two parallel edges;
said curved panel portion having a radius of curvature equal to the radius of curvature of said flaps of said CCP;
a male extension portion jutting out from one of the sides of a non-radiused extent of said BCP;
said male extension portion having a concave side and a convex side;
a slit on an opposite female side of the non-radiused extent of said BCP where said male extension portion is placed;
a channel extending inward from the slit of said BCP;
wherein within each flap of said CCP, is a channel extending inward from a slit on an open end or female side of said respective flap;
wherein said slit of each flap and internal dimensions of said channel of said flap are cross-sectionally identical to that of the slit of said BCP and the channel of said BCP, respectively;
said BCP's curved panel portion is cuttable to length with the use of a paper cutter or heavy-duty pair of scissors.

2. The system as recited in claim 1, further comprising:
a concavo-convex coving adaptor piece (CAP);
a curved center portion with a concave outward-facing side and convex wall-facing side;
said curved center portion having two sets of two parallel edges, wherein one set of parallel edges is perpendicular to the other set of parallel edges;
said curved center portion having a radius of curvature equal to the radius of curvature of each flap of said CCP and the radius of curvature of said curved panel portion of the BCP;
a pair of radiused male extension portions each extending from opposing lateral extents of said curved center portion of the CAP;
wherein each male extension portion of said CAP has a concave side and a convex side;
said male extension portions each having a finite thickness that spans a portion of an arc length of said curved portion of the CAP;
wherein the opening of the slit and the internal dimensions of the channel of said BCP and said CCP are just large enough to receive, guide, and align said male extension portions from another said BCP and said CAP in a slip-fit manner.

3. The system as recited in claim 2:
wherein each flap of said CCP, each curved panel portion of said BCP, and each curved center portion of said CAP have a pair of radial extents;
wherein a non-radiused lip is attached to or extending from each radial extent of each flap of said CCP, each radial extent of each curved panel portion of said BCP, and each radial extent of each curved center portion of said CAP;
wherein each of said lips is attachable to a nearest wall or surface of the room;
wherein attachment of said lips is achievable with the use of fasteners or adhesives including tape with a peelable non-stick backing.

4. A system for coving a room into a cyclorama, comprising:
a concavo-convex corner coving piece (CCP);
said CCP having a radiused center pocket with a concave outward-facing side and a convex wall-facing side;
wherein a plurality of edges of said center pocket forms a substantially triangular shape when viewed along an axis orthogonal to the centroid of the center pocket;
said CCP having a plurality of radiused flaps, wherein each flap extends outward from one of the edges of the center pocket;
said flaps each having a radius of curvature identical to a radius of curvature of the center pocket;
a concavo-convex bridging coving piece (BCP);
said BCP having a curved panel portion with a concave outward-facing side and a convex wall-facing side;
said curved panel portion having two sets of two parallel edges, wherein one set of the two sets of two parallel edges is perpendicular to the other set of the two sets of two parallel edges;
said curved panel portion having a radius of curvature equal to the radius of curvature of said flaps of said CCP;
a male extension portion jutting out from one of the sides of a non-radiused extent of said BCP;
said male extension portion having a concave side and a convex side;
a slit on an opposite side of the non-radiused extent of said BCP where said male extension portion is placed;
a channel extending inward from the slit of said BCP;

wherein within each flap of said CCP, is a channel extending inward from a slit on an open end or female side of said respective flap;

wherein said slit of each flap and internal dimensions of said channel of said flap are cross-sectionally identical to that of the slit of said BCP and the channel of said BCP, respectively.

5. The system as recited in claim 4, further comprising:

a concavo-convex coving adaptor piece (CAP);

a curved center portion with a concave outward-facing side and convex wall-facing side;

said curved center portion having two sets of two parallel edges, wherein one set of parallel edges is perpendicular to the other set of parallel edges;

said curved center portion having a radius of curvature equal to the radius of curvature of each flap of said CCP and the radius of curvature of said curved panel portion of the BCP;

a pair of radiused male extension portions each extending from opposing lateral extents of said curved center portion of the CAP;

wherein each male extension portion of said CAP has a concave side and a convex side;

said male extension portions each having a finite thickness that spans a portion of an arc length of said curved portion of the CAP;

wherein the opening of the slit and the internal dimensions of the channel of said BCP and said CCP are just large enough to receive, guide, and align said male extension portions from another said BCP and said CAP in a slip-fit manner.

6. The system as recited in claim 5:

wherein each flap of said CCP, each curved panel portion of said BCP, and each curved center portion of said CAP have a pair of radial extents;

wherein a non-radiused lip is attached to or extending from each radial extent of each flap of said CCP, each radial extent of each curved panel portion of said BCP, and each radial extent of each curved center portion of said CAP;

wherein each of said lips is attachable to a nearest wall or surface of the room.

* * * * *